United States Patent
Chao et al.

(10) Patent No.: US 12,417,328 B2
(45) Date of Patent: Sep. 16, 2025

(54) MACHINE AND PROCESS TO DESIGN, VALIDATE, AND/OR TEST A FLUID SYSTEM

(71) Applicant: The Boeing Company, Chicago, IL (US)

(72) Inventors: Alex W. Chao, Rancho Palos Verdes, CA (US); Thanh P. Duong, Anaheim, CA (US); Nathaniel Keyek-Franssen, Orlando, FL (US); Roland E. Mah, Monterey Park, CA (US); Kevin A. Nemeth, Redondo Beach, CA (US); Albert Portillo, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 919 days.

(21) Appl. No.: 17/455,028

(22) Filed: Nov. 16, 2021

(65) Prior Publication Data

US 2023/0153494 A1  May 18, 2023

(51) Int. Cl.
| | |
|---|---|
| *G06F 30/28* | (2020.01) |
| *G06F 16/901* | (2019.01) |
| *G06F 30/12* | (2020.01) |
| *G06F 30/15* | (2020.01) |

(52) U.S. Cl.
CPC .......... *G06F 30/28* (2020.01); *G06F 16/9024* (2019.01); *G06F 30/12* (2020.01); *G06F 30/15* (2020.01)

(58) Field of Classification Search
CPC ...... G06F 30/20; G06F 30/28; G06F 16/9024; G06F 30/12; G06F 30/15
See application file for complete search history.

(56) References Cited

U.S. PATENT DOCUMENTS

| | | | |
|---|---|---|---|
| 10,389,458 B2 * | 8/2019 | Hotra | G09B 23/181 |
| 2012/0096043 A1 * | 4/2012 | Stevens, Jr. | G06F 16/9024 707/E17.011 |
| 2018/0276321 A1 | 9/2018 | Angelico et al. | |
| 2018/0276331 A1 | 9/2018 | Hotra et al. | |

OTHER PUBLICATIONS

S. Sierla, M. Azangoo, A. Fay, V. Vyatkin, N. Papakonstantinou, "Integrating 2D and 3D Digital Plant Information Towards Automatic Generation of Digital Twins", IEEE pp. 460-467, (Year: 2020).*

* cited by examiner

*Primary Examiner* — Kibrom K Gebresilassie

(74) *Attorney, Agent, or Firm* — Yee & Associates, P.C.

(57) ABSTRACT

A machine and process for visualizing and interacting with a virtual model for a propulsion and/or fluid system. The machine includes a modular construction that includes a display server that comprises a socket in communication with a socket in a second server that comprises a piping evaluator that includes a traversal graph that accelerates processing of inputs for an executable block diagram for the propulsion and/or fluid system displayed on a graphical user interface. The traversal graph accesses support files generated by a scan shapes tool in communication with a diagram and vector graphic application with tailored stencils.

100 Claims, 15 Drawing Sheets

MACHINE AND PROCESS TO DESIGN, VALIDATE, AND/OR TEST A FLUID SYSTEM

BACKGROUND INFORMATION

Field

The present disclosure relates generally to a fluid system and rocket science. More specifically, the present disclosure relates to a machine and process to design, validate, and/or verify by test a fluid system, such as without limitation a propulsion system, such as without limitation a propulsion system for a rocket or a satellite.

Background

Systems used in fluid processing, such as without limitation a propulsion system, may operate with a flow, a commodity, a composition, and/or a pressures that require controlled tolerances and/or precise design and/or component manufacture, assembly, and/or interaction. Systems used in fluid processing, such as without limitation a propulsion system, require at least design, verification by test, and/or validation that provide a high degree of reliability, accuracy, and predictability in a manner that reduces risks of unintended consequences from the design and/or operation of those systems.

The illustrative examples recognize and take into account that until now, the design and testing of fluid processing, such as without limitation a propulsion system, has been a manually intensive process. As a non-limiting example, space-based propulsion systems may include manned and unmanned rockets and/or missiles that travel into and/or through space above the earth. Both process execution as well as design of fluid processing systems, such as without limitation a propulsion system, have relied heavily on the experience base of the operators and engineers. Hence, the illustrative examples recognize and take into account that there is a need for a technology that applies a Model Based Engineering (MBE) technology to integrate product requirements, functions, and behaviors, in a machine and process that provides verification and/or validation of a design before an operation of the hardware in fluid processing, such as without limitation a propulsion system.

Therefore, it would be desirable to have a machine and/or a process that takes into account at least some of the issues discussed above, as well as other possible issues. For example, it would be desirable to have a machine and process for design and/or validation of a fluid processing system, such as without limitation a propulsion system.

SUMMARY

An example of the present disclosure provides a novel machine and associated processes. The machine may include at least a display server that may include: a graphical user interface configured to generate a block diagram that may include an object that may represent a component in a propulsion system; and a first socket configured to communicate with a second socket in a propulsion server associated with a scan shapes tool that may include a data extraction program configured to generate and store: a translation table, a ganged map table, and an object index, configured to accelerate a traversal algorithm configured to control a visualizer in the display server. The propulsion server may be configured to design, validate, and verify at least one of the following: a design, an assembly, or an integration, of objects in a propulsion system. The block diagram may be a diagram of a propulsion system.

The propulsion server may include a command handler configured to update a state of an object in the propulsion system. The propulsion server may include a propulsion piping evaluator configured to recursively update the piping for a propulsion system. The propulsion server may include the traversal algorithm and may be configured to generate and access the translation table, the ganged map table, and the object index, configured to input into the traversal algorithm. The propulsion piping evaluator in the propulsion server may include the traversal algorithm.

Further, the propulsion server may include an action log configured to record all activities that transpire in the block diagram. The propulsion server may be configured to update at least one of: an identification, a state, and a color, of each component of the propulsion system as represented in the block diagram, respectively, by an object in the block diagram. The object may include a categorization selected from a group that consists of: an active object, a passive object, and piping. The object may include a set of rules and a set of behaviors. The object may include a categorization as an active object that may include at least one of the following states: on, off, a pressure, a composition, and a commodity type.

Accordingly, the novel machine may provide at least a first process for visualizing a propulsion system. The first process may include: generating a block diagram on a graphical user interface in a propulsion visualization machine receiving an input for a device in the propulsion system to be displayed by a visualizer on the graphical user interface as an object in the block diagram; a display server may include the graphical user interface and passing the input to a propulsion piping evaluator in a propulsion server; responsive to the input, the propulsion piping evaluator applying an algorithm evaluating a flow or a pressure in an object or a piping in the propulsion system; and the propulsion piping evaluator generating a traversal graph of all devices and piping in the propulsion system. The first process for visualizing a propulsion system may further include: the propulsion server running a traversal algorithm updating a state of each object in the block diagram via transmitting the update to a visualizer in the display server; the display server updating an indication of the state of the object on the block diagram; the propulsion piping evaluator updating a color code for the object and a color code for the piping and transmitting the update to the display server; and the display server updating an indication of the color code for the object and the color code for the piping on the block diagram.

The first process may include the propulsion piping evaluator generating a composition or a pressure traversing to a specific connection at a source object and routed through connections to a destination object in the propulsion system. The first process may also include verifying a receipt or an absence of a composition or a pressure in connections to a destination object; and responsive to the absence, identifying a particular connection at which an error occurred in the receipt of the composition or the pressure, and the particular connection and a particular virtual module respectively connected to and including the particular connection. The state of the device may be selected from a group including at least one of the following: on, off, a pressure, a composition, and a commodity type. Additionally, the propulsion server may create a traversal graph tracking all objects traversed in the block diagram during a runtime visualization of the propulsion system.

The first process may also include the propulsion server creating, using traversal logic using a state of an active object and a behavior definition of a passive object in the block diagram, a traversal graph tracking all objects traversed in the block diagram during a runtime visualization of the propulsion system. The propulsion piping evaluator may also categorize each object in the block diagram as one of: an active object, a passive object, and the piping. An active object may include at least one of the following: an origination point for property state values for the block diagram, or an interactive object of the block diagram triggering a change in a state of a downline object in the propulsion system presented in the block diagram.

The piping may be any device connecting two objects of the propulsion system together in the block diagram and carrying a fluid or a pressure from one object to a downline object in the block diagram. Further, the piping may carry a value for one of the following: a pressure, a composition, or a commodity type from one object, to a downline object in the block diagram.

The first process for visualizing a propulsion system may also include recording all activities during a runtime on the block diagram in an action log, and include using an action log of all activities during a runtime on the block diagram for rolling back actions of the propulsion system indicated on the block diagram to a desired prior point in the runtime. Additionally, the action log of all activities during a runtime on the block diagram may be used for establishing a starting condition for a new runtime of the block diagram.

The first process for visualizing a propulsion system may also include recording a snapshot in a runtime for the block diagram at a selected time recording a state of all valves in the propulsion system presented in the block diagram and/or of all pressure regulators in the propulsion system presented in the block diagram. The first process may further include accelerating processing of the traversal algorithm via a data extraction program in a scan shapes tool creating support files comprising: a translation table, a ganged map table, and an object index; and the traversal algorithm accessing the support files.

The first process for visualizing a propulsion system may also include receiving the input for a change to the state of the object into propulsion server from an external command and control system communicating with the propulsion server. The first process may further include a scan shapes tool extracting essential elements of data attached to each object in a schematic in a diagram and vector graphic application, and creating a translation table, a ganged map table, and an object index, accessed by a propulsion piping evaluator. Finally, the first process for visualizing a propulsion system may include constructing the block diagram comprising, for each object, tailored propulsion system stencils comprising data indicating: component type, connections, and/or properties, specific to the object respectively.

Additionally, at least a second process for visualizing a propulsion system, may include: building a schematic of the propulsion system in a diagram and vector graphic application accessing a stencil, respectively, for each object placed into the schematic, the stencil comprising data associated with the object and comprising component type, connections, and properties specific to the object; running a check error program for a scalar vector graphic file built, from input, by a diagram and vector graphic application; responsive to the scalar vector graphic file being error free, creating, using a data extraction program, the following: a translation table, a ganged map table, and an object index, from the data associated with the object in the scalar vector graphic file; converting the schematic into a scalar vector graphic file and loading the scalar vector graphic file of into a scalar graphic application in a display server for presenting a block diagram; receiving an input for a device in the propulsion system to be displayed by the visualizer on the block diagram on a graphical user interface as the object; the display server passing the input to a propulsion server; responsive to the input, the propulsion server applying an algorithm evaluating a piping in the propulsion system; a scan shapes tool generating a list of all devices and piping in the propulsion system; the propulsion server running a traversal algorithm updating a state of the device in the propulsion server and transmitting the update to the display server; the display server updating an indication of the state of the object on the block diagram; the propulsion server updating a color code for the device and a color code for the piping and transmitting the update to the display server; and the display server updating an indication of the color code for the device and the color code for the piping on the block diagram. The second process for visualizing a propulsion system may also include generating a fluid or a pressure traversing to a specific connection at an origination object and routed through connections to a destination.

Additionally, the second process for visualizing a propulsion system may include verifying a receipt or an absence of a fluid or a pressure in the connections; and responsive to the absence, identifying a particular connection at which an error occurred in the receipt of the composition or the pressure, and the particular connection and a particular object respectively connected to and including the particular connection. The second process may include a state of the object being selected from a group comprising at least one of the following: on, off, a pressure, a composition, and a commodity type. The second process may also include the propulsion server creating a traversal graph tracking all objects traversed in the block diagram during a runtime visualization of the propulsion system, and/or creating, using traversal logic using a state of an active object and a behavior definition of a passive object in the block diagram, a graph tracking all objects traversed in the block diagram during a runtime visualization of the propulsion system.

The second process of visualizing a propulsion system may also include categorizing each object in the block diagram as one of the following: an active object, a passive object, and the piping. An active object may include at least one of the following: an origination point for property state values for the block diagram, or an interactive object of the block diagram triggering a change in a state of a downline object in the propulsion system presented in the block diagram. Further, the piping may be any device connecting two objects of the propulsion system together in the block diagram and carrying a fluid or a pressure from one object to a downline object in the block diagram. The piping may also be any device connecting two objects of the propulsion system together in the block diagram and carrying a value for one of the following: a pressure, a composition, or a commodity type of one object, to a downline object in the block diagram.

The second process may include recording all activities during a runtime on the block diagram in an action log. The second process may include using an action log of all activities during a runtime on the block diagram for rolling back actions of the propulsion system indicated on the block diagram to a desired prior point in the runtime. The second process may include using an action log of all activities during a runtime on the block diagram for establishing a starting condition for a new runtime of the block diagram.

Additionally, the second process for visualizing a propulsion system may include recording a snapshot in a runtime for the block diagram at a selected time recording a state of all valves in the propulsion system presented in the block diagram. The second process may include recording a snapshot in a runtime for the block diagram at a selected time recording a state of all pressure regulators in the propulsion system presented in the block diagram.

The second process may include accelerating processing of the traversal algorithm via a data extraction program in a scan shapes tool creating support files comprising the following: a translation table, a ganged map table, and an object index; and the traversal algorithm accessing the support files. The second process may include receiving the input for a change to the state of the device into the propulsion server from an external command and control system communicating with the propulsion server.

Further, the second process of visualizing a propulsion system may include the scan shapes tool extracting essential elements of data attached to each object in a schematic in a diagram and vector graphic application, and creating the following: a translation table, a ganged map table, and an object index, accessed by a fluid piping evaluator. Finally, the second process may include constructing the block diagram comprising tailored propulsion system stencils comprising object data comprising data indicating the following: component type, connections, and/or properties, specific to the object respectively.

Yet another example of the present disclosure provides a machine that may include at least: a display server that may include: a graphical user interface configured to generate a block diagram that may include an object that may represent a component in a fluid system; and a first socket configured to communicate with a second socket in a fluid server associated with a scan shapes tool that may include a data extraction program configured to generate and store: a translation table, a ganged map table, and an object index, configured to accelerate a traversal algorithm configured to control a visualizer in the display server. The fluid server may be configured to design, validate, and verify at least one of the following: a design, an assembly, or an integration, of objects in a fluid system. The block diagram may be a diagram of a fluid system.

The fluid server may include a command handler configured to update a state of an object in the fluid system. The fluid server may include a fluid piping evaluator configured to recursively update the piping for a fluid system. The fluid server may include the traversal algorithm and may be configured to generate and access the translation table, the ganged map table, and the object index, configured to input into the traversal algorithm. The fluid piping evaluator in the fluid server may include the traversal algorithm.

Further, the fluid server may include an action log configured to record all activities that transpire in the block diagram. The fluid server may be configured to update at least one of: an identification, a state, and a color, of each component of the fluid system as represented in the block diagram, respectively, by an object in the block diagram. The object may include a categorization selected from a group that consists of: an active object, a passive object, and piping. The object may include a set of rules and a set of behaviors. The object may include a categorization as an active object that may include at least one of the following states: on, off, a pressure, a composition, and a commodity type.

Accordingly, the novel machine may provide at least a first process for visualizing a fluid system. The first process may include: generating a block diagram on a graphical user interface in a fluid visualization machine receiving an input for a device in the fluid system to be displayed by a visualizer on the graphical user interface as an object in the block diagram; a display server may include the graphical user interface and passing the input to a fluid piping evaluator in a fluid server; responsive to the input, the fluid piping evaluator applying an algorithm evaluating a flow or a pressure in an object or a piping in the fluid system; and the fluid piping evaluator generating a traversal graph of all devices and piping in the fluid system. The first process for visualizing a fluid system may further include: the fluid server running a traversal algorithm updating a state of each object in the block diagram via transmitting the update to a visualizer in the display server; the display server updating an indication of the state of the object on the block diagram; the fluid piping evaluator updating a color code for the object and a color code for the piping and transmitting the update to the display server; and the display server updating an indication of the color code for the object and the color code for the piping on the block diagram.

The first process may include the fluid piping evaluator generating a fluid or a pressure traversing to a specific connection at a source object and routed through connections to a destination object in the fluid system. The first process may also include verifying a receipt or an absence of a fluid or a pressure in connections to a destination object; and responsive to the absence, identifying a particular connection at which an error occurred in the receipt of the fluid or the pressure, and the particular connection and a particular virtual module respectively connected to and including the particular connection. The state of the device may be selected from a group including at least one of the following: on, off, a pressure, a composition, and a commodity type. Additionally, the fluid server may create a traversal graph tracking all objects traversed in the block diagram during a runtime visualization of the fluid system.

The first process may also include the fluid server creating, using traversal logic using a state of an active object and a behavior definition of a passive object in the block diagram, a traversal graph tracking all objects traversed in the block diagram during a runtime visualization of the fluid system. The fluid piping evaluator may also categorize each object in the block diagram as one of: an active object, a passive object, and the piping. An active object may include at least one of the following: an origination point for property state values for the block diagram, or an interactive object of the block diagram triggering a change in a state of a downline object in the fluid system presented in the block diagram.

The piping may be any device connecting two objects of the fluid system together in the block diagram and carrying a fluid or a pressure from one object to a downline object in the block diagram. Further, the piping may carry a value for one of the following: a pressure, a composition, or a commodity type from one object, to a downline object in the block diagram.

The first process for visualizing a fluid system may also include recording all activities during a runtime on the block diagram in an action log, and include using an action log of all activities during a runtime on the block diagram for rolling back actions of the fluid system indicated on the block diagram to a desired prior point in the runtime. Additionally, the action log of all activities during a runtime on the block diagram may be used for establishing a starting condition for a new runtime of the block diagram.

The first process for visualizing a fluid system may also include recording a snapshot in a runtime for the block diagram at a selected time recording a state of all valves in the fluid system presented in the block diagram and/or of all pressure regulators in the fluid system presented in the block diagram. The first process may further include accelerating processing of the traversal algorithm via a data extraction program in a scan shapes tool creating support files comprising: a translation table, a ganged map table, and an object index; and the traversal algorithm accessing the support files.

The first process for visualizing a fluid system may also include receiving the input for a change to the state of the object into fluid server from an external command and control system communicating with the fluid server. The first process may further include a scan shapes tool extracting essential elements of data attached to each object in a schematic in a diagram and vector graphic application, and creating a translation table, a ganged map table, and an object index, accessed by a fluid piping evaluator. Finally, the first process for visualizing a fluid system may include constructing the block diagram comprising, for each object, tailored fluid system stencils comprising data indicating: component type, connections, and/or properties, specific to the object respectively.

Additionally, at least a second process for visualizing a fluid system, may include: building a schematic of the fluid system in a diagram and vector graphic application accessing a stencil, respectively, for each object placed into the schematic, the stencil comprising data associated with the object and comprising component type, connections, and properties specific to the object; running a check error program for a scalar vector graphic file built, from input, by a diagram and vector graphic application; responsive to the scalar vector graphic file being error free, creating, using a data extraction program, the following: a translation table, a ganged map table, and an object index, from the data associated with the object in the scalar vector graphic file; converting the schematic into a scalar vector graphic file and loading the scalar vector graphic file of into a scalar graphic application in a display server for presenting a block diagram; receiving an input for a device in the fluid system to be displayed by the visualizer on the block diagram on a graphical user interface as the object; the display server passing the input to a fluid server; responsive to the input, the fluid server applying an algorithm evaluating a piping in the fluid system; a scan shapes tool generating a list of all devices and piping in the fluid system; the fluid server running a traversal algorithm updating a state of the device in the fluid server and transmitting the update to the display server; the display server updating an indication of the state of the object on the block diagram; the fluid server updating a color code for the device and a color code for the piping and transmitting the update to the display server; and the display server updating an indication of the color code for the device and the color code for the piping on the block diagram. The second process for visualizing a fluid system may also include generating a fluid or a pressure traversing to a specific connection at an origination object and routed through connections to a destination.

Additionally, the second process for visualizing a fluid system may include verifying a receipt or an absence of a fluid or a pressure in the connections; and responsive to the absence, identifying a particular connection at which an error occurred in the receipt of the fluid or the pressure, and the particular connection and a particular object respectively connected to and including the particular connection. The second process may include a state of the object being selected from a group comprising at least one of the following: on, off, a pressure, a composition, and a commodity type. The second process may also include the fluid server creating a traversal graph tracking all objects traversed in the block diagram during a runtime visualization of the fluid system, and/or creating, using traversal logic using a state of an active object and a behavior definition of a passive object in the block diagram, a graph tracking all objects traversed in the block diagram during a runtime visualization of the fluid system.

The second process of visualizing a fluid system may also include categorizing each object in the block diagram as one of the following: an active object, a passive object, and the piping. An active object may include at least one of the following: an origination point for property state values for the block diagram, or an interactive object of the block diagram triggering a change in a state of a downline object in the fluid system presented in the block diagram. Further, the piping may be any device connecting two objects of the fluid system together in the block diagram and carrying a fluid or a pressure from one object to a downline object in the block diagram. The piping may also be any device connecting two objects of the fluid system together in the block diagram and carrying a value for one of the following: a pressure, a composition, or a commodity type of one object, to a downline object in the block diagram.

The second process may include recording all activities during a runtime on the block diagram in an action log. The second process may include using an action log of all activities during a runtime on the block diagram for rolling back actions of the fluid system indicated on the block diagram to a desired prior point in the runtime. The second process may include using an action log of all activities during a runtime on the block diagram for establishing a starting condition for a new runtime of the block diagram.

Additionally, the second process for visualizing a fluid system may include recording a snapshot in a runtime for the block diagram at a selected time recording a state of all valves in the fluid system presented in the block diagram. The second process may include recording a snapshot in a runtime for the block diagram at a selected time recording a state of all pressure regulators in the fluid system presented in the block diagram.

The second process may include accelerating processing of the traversal algorithm via a data extraction program in a scan shapes tool creating support files comprising the following: a translation table, a ganged map table, and an object index; and the traversal algorithm accessing the support files. The second process may include receiving the input for a change to the state of the device into the fluid server from an external command and control system communicating with the fluid server.

Further, the second process of visualizing a fluid system may include the scan shapes tool extracting essential elements of data attached to each object in a schematic in a diagram and vector graphic application, and creating the following: a translation table, a ganged map table, and an object index, accessed by a fluid piping evaluator. Finally, the second process may include constructing the block diagram comprising tailored fluid system stencils comprising object data comprising data indicating the following: component type, connections, and/or properties, specific to the object respectively.

The features and functions can be achieved independently in various examples of the present disclosure. The features and functions can be combined in yet other examples. Further details of the features and functions can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
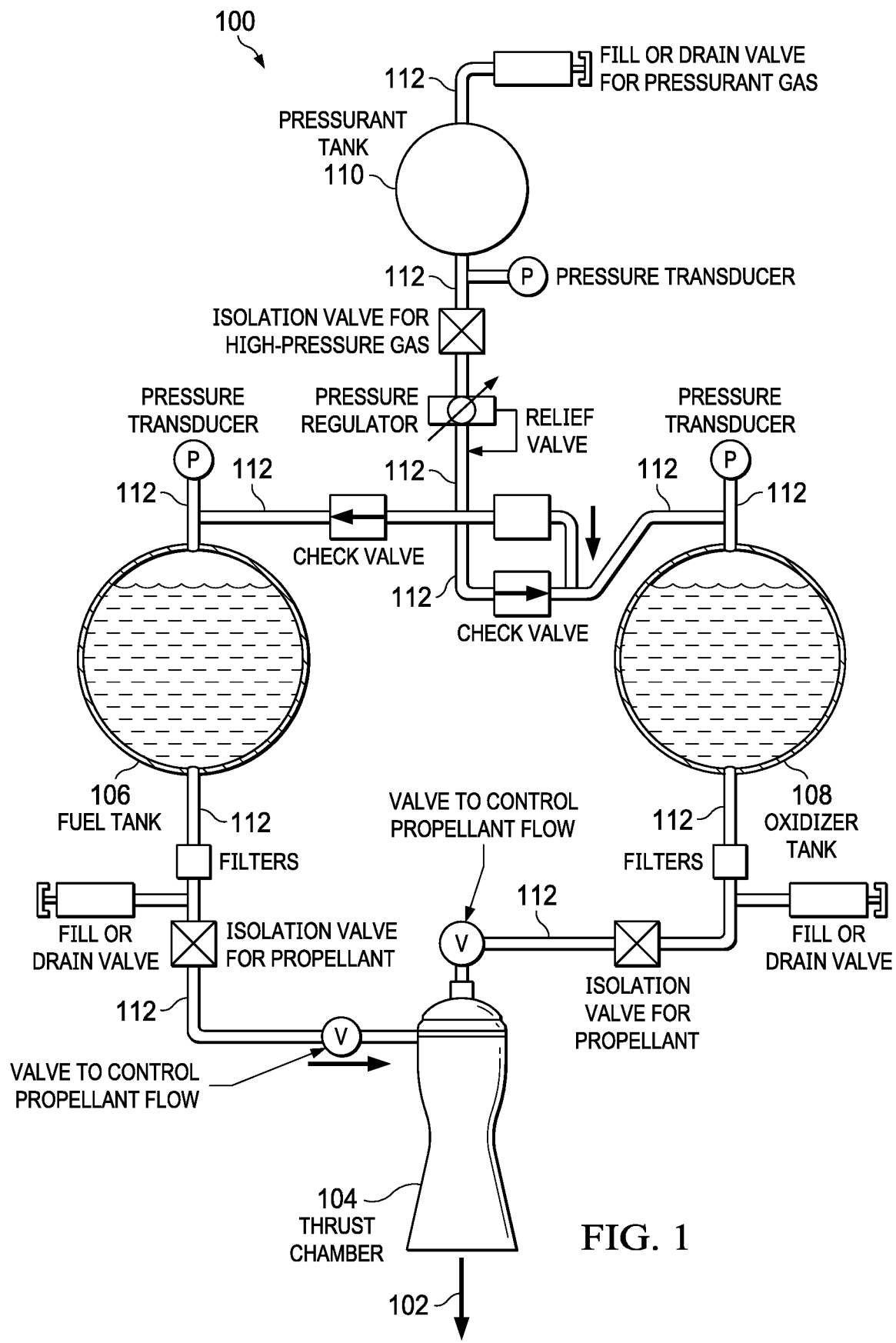
FIG. 1 is an illustration of a plan view of a propulsion system depicted in accordance with an illustrative example.

The illustrative examples recognize and take into account one or more different considerations. The illustrative examples recognize and take into account that currently there is no machine capable of precise verification and/or validation of operation of a propulsion system and/or interacting with a virtual model thereof before executing propulsion procedures on flight hardware. There are no industry tools able to support rapid virtualization development that integrates with existing design and testing systems and can be used for development, validation, integration, verification by test, and reliability tracking for a fluid processing system, such as without limitation a propulsion system.

The illustrative examples recognize and take into account that each subsystem of a design, build and deployment for a propulsion system, a fluid system, and/or a satellite launch system may have specific requirements that must be met during assembly, integration, and/or testing for at least compatibility, functionality, and/or reliability with other subsystem components as well as interactions with other systems. Subsequent verification, validation, and compliance for each subsystem will follow a format driven by the specific requirements for each subsystem and their interfaces. Verifications events may include analysis, demonstration, test, or inspection. Verification by test is one of several ways can be checked as being fulfilled.

Current fluid and/or propulsion systems verification by test for actual physical components can be prohibitively time consuming and expensive. The illustrative examples recognize and take into account that current analytical techniques do not allow for a visualization and/or animation/virtualization of interactions of components to the extent necessary for design, validation, and/or verification by test of a fluid processing system, such as without limitation a propulsion system, at least because existing techniques are based on individually/sequentially performing components without a full integration of their effect on each other.

Thus, what is needed is a virtual fluid and/or propulsion system configured to simulate and/or interactively model the mechanical behaviors of an equivalent physical fluid/propulsion system. What is needed is a virtual fluid and/or propulsion system modeling environment wherein the initial parameters of the virtual system may be selected and provided through a user interface accessible to a designer, and virtual test equipment configured to simulate equivalent physical test equipment, and wherein the modeling environment establishes an executable block diagram for performing a simulation of the fluid/propulsion system controllable and observable through a user interface.

Hence, examples herein describe a machine and process that enable virtualizing in a visual simulation and interacting with a virtual model thereof at least propulsion and/or fluid subsystems, and improving the quality across all phases of at least design, build, and flight, by aiding the technical community in at least analysis, documentation, integration, and system functionality investigations during at least design, manufacture, and/or operational flight. Further still, examples of the machine and process as described herein produce a virtualization and interaction with a virtual model thereof that may serve at least as a test engineering development, verification by test, and/or reliability validation tool for, without limitation a satellite and/or rocket propellant fueling, high pressure system testing, and/or any fluid processing. Finally, examples of the machine and process as described herein may be used as a tool to develop procedures at least for test engineering development, verification by test, and/or reliability validation for without limitation a satellite and/or rocket propellant fueling, high pressure system testing, and/or any fluid processing.

Examples herein describe a machine and a process that enable a propulsion system and/or a fluid system and/or operations thereof to be designed, verified, and validated in a virtual environment. The illustrative examples recognize and take into account that such a machine and process are able to reduce risk and/or human error in the development, writing and review of propulsion operations. Thereby, both the reliability and first time quality of the operations and execution are provided.

The illustrative examples recognize and take into account that such a machine and process provide technological improvements over an existing "Method and Apparatus for Testing RF Performance of a Satellite Wiring Harness and Signal Processing Units" as described by U.S. Pat. No. 10,389,458, issued to The Boeing Company on Aug. 20, 2019, and incorporated herein in its entirety.

The illustrative examples recognize and take into account that complexities of fluid and/or propulsion system modeling, that the visualization architectures described by U.S. Pat. No. 10,389,458, or U.S. Patent Publication No. 2018/0276321 A1 may not fully accommodate processing needs for at least the precision and/or reliability desired for a fluid and/or propulsion system modeling. Hence, the illustrative examples recognize and take into account that the examples herein of a machine and process provide technological improvements over at least an existing "Method and Apparatus for Testing Design of Satellite Wiring Harness and Signal Processing Units" as described by U.S. Patent Publication No. 2018/0276321 A1 of Sep. 27, 2018, or as described in or U.S. Patent Publication No. 2018/0276321; both incorporated herein in their entirety.

The illustrative examples recognize and take into account that propulsion and fluid processing systems have different design, validation, and operation complexities from satellite RF (radio-frequency) wiring and/or RF cabling systems, such that different virtualization architecture needed to be created to accommodate the different complexities. As a result, the novel virtualization machine and process described herein is now able to accommodate the complexities of a propulsion and/or fluid system as well as other complexities for other systems.

The technological improvements of the novel machine and process described herein also provide capability for a fully backwards visualization of the behavioral functions for the payloads, such as without limitation communication payloads, as described in U.S. Pat. No. 10,389,458, as well as for any propulsion/fluid system behaviors that will be added for any propulsion/fluid system in the future.

The illustrative examples recognize and take into account that there is a need for, and provide illustrations of a novel technological solution for, a technology that will allow a designer to perform critical pre-operation verification and/or validations of proper valve open and close sequences in a propulsion and/or fluid system. This is expressly critical during the development of operation with satellite and/or rocket fuels, and when testing delicate propulsion and fluid systems.

The novel machine and process herein also allows for in-process tracking of design steps and operational functionalities and component interactions. Tracking may be performed by an engineer and/or a system operator. The novel machine and process herein also provide a quality oversight has the ability to track and visually display each critical operation and to identify and/or intervene when an unintended and/or undesired outcome is anticipated and/or recognized.

The illustrative examples herein recognize and take into account that a modular design for a propulsion server and for a propulsion display system may enable a visualization component of a propulsion visualization machine to operate independently. A modular design for a propulsion server and for a propulsion display system may also enable flexibility in command and control of the propulsion visualization machine through either direct interaction on the display interface or connecting to an external software application designed to command a system of interest.

The illustrative examples herein recognize and take into account that creating a traversal graph for the propulsion visualization machine using tailored resource files provides a technological improvement that improves the computer operation of the system at least by reducing processing time for required traversal operations—especially under heavy processing loads, such as without limitation running input scripts and/or sequences—as compared to prior visualization systems that lack the novel architecture of the machine and process shown in examples herein. The traversal graph resources the technological improvement to for the propulsion server that include at least: a novel Translation table, GangedMap table, and an Object index in a manner that reduces traversal algorithm processing cycle times.

Further, the illustrative examples herein recognize and take into account that adding a novel action log feature into the propulsion visualization machine provides a technological improvement that improves the computer operation of the system at least by allowing rollback actions and selective configuration restore options for the propulsion system design, visualization, and/or operational verification and/or validation.

The illustrative examples herein recognize and take into account that a technological improvement is needed in executable block diagram applications that can provide an action log of a runtime for a configuration of the propulsion system can record all activities on a propulsion visualization block diagram in a user session. Thereby, a technological improvement is needed such that if unintended actions are made that would result in physically irreversible reactions, the configuration can be rolled back to backtrack to a particular point in the system state without the need to restart a new session in a virtual environment of the propulsion visualization machine.

Additionally, the novel action log feature allows a log file saved from a previous propulsion visualization machine session to be used to restore the system configuration of the same system block diagram in a new session. In other words, a roll-back/reset feature is enabled for a runtime on propulsion visualization machine by the new technology that allows an designer to alter, through a graphical user interface, individual objects and/or groups of objects, or a specific characteristic of an object and/or selected objects, then verify by test the effect of the alteration.

Further still, the illustrative examples herein recognize and take into account that the action log affords a novel integration of a snapshot feature into the propulsion visualization machine configuration. The snapshot feature can capture a snapshot at least of the current state of all valves in the system and thereby support engineers with test planning and development for a fluid system, such as without limitation a propulsion system.

The illustrative examples herein recognize and take into account that current processor technology cannot process scripts and sequences filed with large batches of commands to change states of objects, such as without limitation to run a modular test executive, within an executable block diagram without suffering freeze-up of images in visualization of a propulsion system. Current modular test executive protocols do not enable user interaction with an executable block diagram display, a server, and a user, such as without limitation an engineer. Current modular test executive protocols do not enable user interaction with an executable block diagram display, a server, and a user to process changes in real-time that support at least validation, test planning, and/or development for a fluid system, such as without limitation a propulsion system.

The illustrative examples herein recognize and take into account that a technological improvement of enhancing a categorization of objects, such that the categorizations are tailored for the propulsion server design, improves the capability and efficiency of the processor to accept edits customizing rules and directed behaviors representing properties of physical hardware components of a propulsion and/or fluid system.

Hence the illustrative examples herein recognize and take into account that when verifying by test, there is a unique operational order for all of the stencil objects that correspond to the design of the system of interest. The unique operational order for all of the stencil objects that correspond to the design of the system of interest ensures expected and reliable operational behavior for the system when assembled and tested. The unique operational order for all of the stencil objects that correspond to the design of the system of interest also ensures that artifacts are provided that satisfy the requirements for the system of interest. Artifacts may be values that indicate operational parameters for a fluid or propulsion system, such as without limitation propulsion system 100, or devices therein. Devices within a fluid or propulsion system, such as without limitation propulsion system 100, may be represented by objects in a schematic and/or executable block diagram for the a fluid or propulsion system, such as without limitation propulsion system 100.

Therefore, the illustrative examples herein recognize and take into account requirements of both the system test equipment requirements and the system of interest requirements. The novel machine and process described herein provide an integrated virtualization solution supporting the safe operations for the system test equipment, the system of interest and the engineers and/or operators.

Turning now to FIG. 1, FIG. 1 is a plan view of a propulsion system depicted in accordance with an illustrative example. One of ordinary skill in the art recognizes that a propulsion system is one type of a fluid system, and that example provided below relative to a propulsion system may be generally and specifically applied to other specific fluid systems. Propulsion System 100 shown provides a propulsion 102 from nozzle 104 via connected components that control pressure and fluid combinations of particular compositions of commodities. Without limitation, fuel or oxidizing agents, or other fluids or gasses may be commodities. Without limitation, commodities may be stored at least in fuel tank 106 or oxidizer tank 108 and pressure may originate from pressurant tank 110. As shown in FIG. 1, numerous valves, transducers, piping 112 and fittings are present in propulsion system 100.

FIG. 1 is not intended to give a detailed or limiting representation of a specific fluid and/or propulsion system, but is provided instead to illustrate a general overview of components and arrangements that may be commonly found in a propulsion system. Each specific fluid and/or propulsion system requires detailed design to exacting standards. Each designed fluid and/or propulsion system requires verification by test and validation during assembly, integration, and verification by test during manufacturing to ensure proper workmanship and functional behavior based upon the system of interest requirements as well as before manufacture and/or operational deployment.

The illustration of propulsion system 100 in FIG. 1 is not meant to imply physical or architectural limitations to the manner in which an illustrative example may be implemented. Other components in addition to or in place of the ones illustrated may be used. Some components may be optional. Also, the images of elements in FIG. 1 are presented to illustrate some functional components of propulsion system 100. One of ordinary skill in the art will understand that under some conditions, one or more of these elements may be combined, divided, or combined and divided into different blocks when implemented in an illustrative example.

Figure 2:
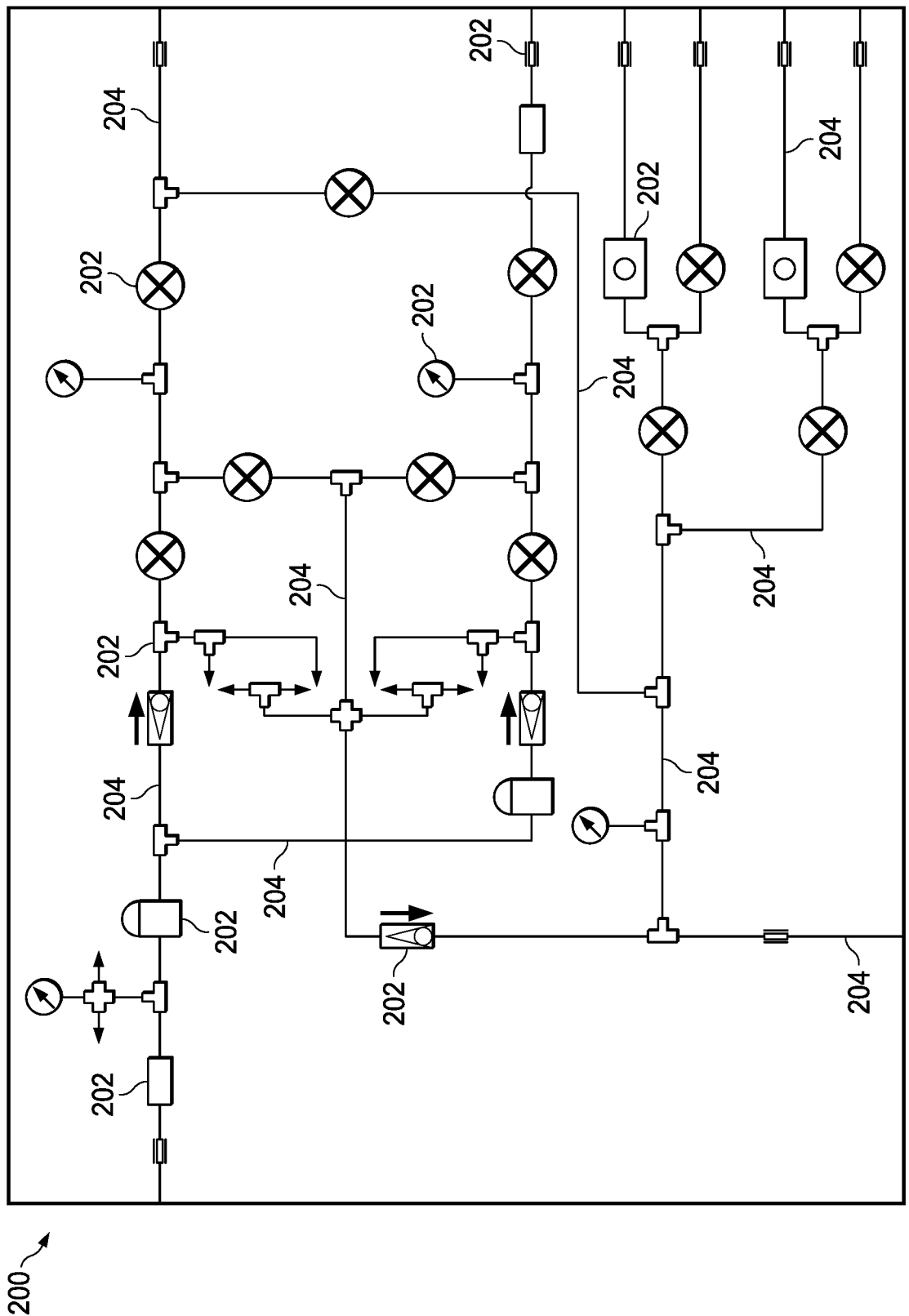
FIG. 2 is an illustration of a plan view of a schematic of a design for a part of a propulsion system is depicted in accordance with an illustrative example e.

Turning now to FIG. 2, a plan view of a schematic of a design for a part of a propulsion system is depicted in accordance with an illustrative example. FIG. 2 provides a plan view of schematic 200 of a design for a small portion of a propulsion system, such as without limitation propulsion system 100 described in block form in FIG. 1.

Schematic 200 represents a product of a design for a load panel for an oxidizer tank, such as without limitation oxidizer tank 108 as shown in FIG. 1. While designing a propulsion system, a design engineer may produce a schematic, such as without limitation schematic 200, that designates objects 202 of various types and connections 204 thereof for the propulsion system. labeled objects 202 and connections 204 in schematic 200 are not meant to be limiting or exclusive to those labeled in this example of schematic for a physical component such as, without limitation oxidizer tank 108 or propulsion system 100 as shown in FIG. 1, but are provided instead to provide a partial indication of how objects 202 or connections 204 may be used in a design schematic. Objects 202 may represent, without limitation, any component or device or unit that forms a part of a propulsion system and/or the fluid system and/or a component thereof, such as without limitation propulsion system 100 and/or oxidizer tank 108 as shown in FIG. 1.

Connections 204 may be, without limitation, piping configured to allow travel of a composition from one object in propulsion system 100 to another object within or associated with propulsion system 100. A word document may be drafted to accompany schematic 200 to describe interfacing between components and operational procedures and parameters of the elements within the schematic.

Hence, the schematic may serve as a plan for manufacture of the propulsion system, but lacks a functionality for visualization of the system in operation. Accordingly, schematic 200 does not provide a functional validation of the design before executing propulsion operations on actual hardware of a physical propulsion system or serve as a testing platform for the propulsion system. Likewise, a schematic, such as without limitation schematic 200, does not serve as an agile developmental tool for evaluating alternative design choices. Before the process and machine described herein, no industry tools exist to support rapid virtualization development that integrates with existing operational systems and for development, validation, integration, testing, and tracking of precision and reliability of propulsion and/or fluid systems.

Figure 3:
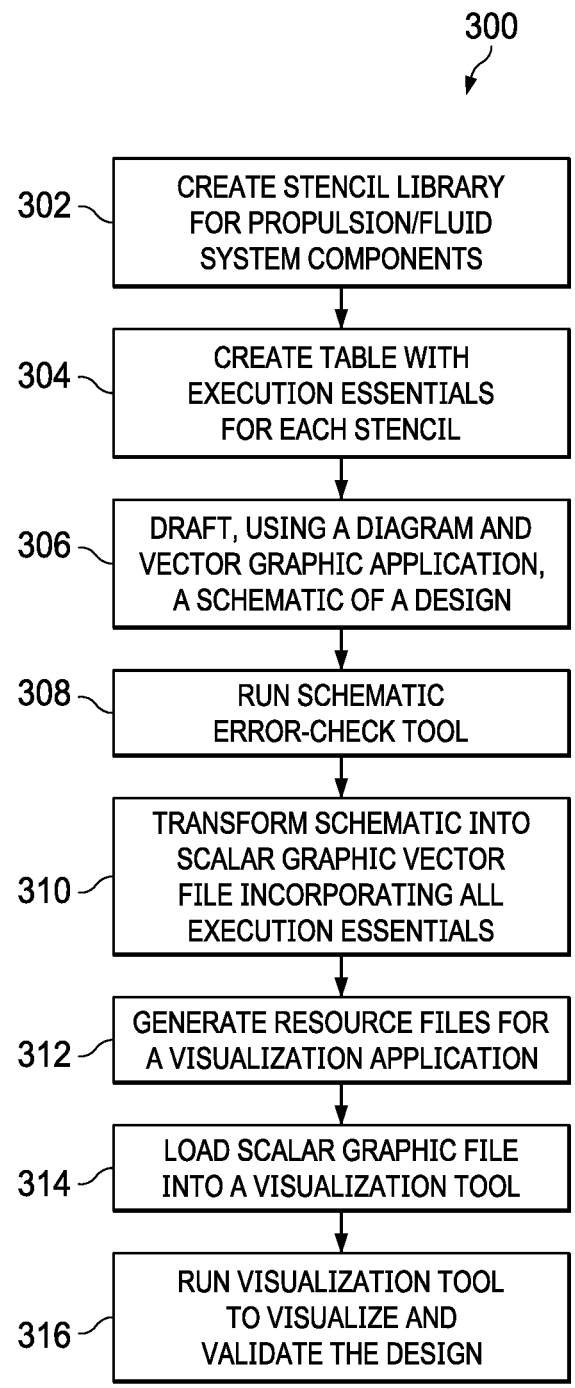
FIG. 3 is an illustration of a flowchart of a process for integrating a virtualization tool for the design, validation, testing, and monitoring of propulsion and/or fluid system operations depicted in accordance with an illustrative example.

Turning now to FIG. 3, a flowchart is shown of a process for integrating a virtualization tool for the design, validation, testing, and monitoring of propulsion and/or fluid system operations depicted in accordance with an illustrative example. Process 300 depicted in FIG. 3 may begin with creating novel stencil shapes, for each object unique to a propulsion system and/or a fluid system, that are accessible to and usable by a diagram and vector graphic application. (operation 302). Example stencils produced in operation 302 are visible in FIG. 4. An object may represent, without limitation, any component or device or unit that forms a part of the propulsion system and/or the fluid system.

For each stencil shape to be usable with the novel example process and machine described herein, a novel execution table is generated and associated with and/or embedded within the stencil coding to provide execution essentials related to the object represented by the stencil shape (operation 304). The object may represent, without limitation, any component or device or unit that forms a part of the propulsion system and/or the fluid system.

Execution essentials may include, for each individual object, without limitation respectively: a unique identification, composition, construction and/or performance characteristics, connection and/or function specifics, and/or state options. Performance characteristics may include without limitation, pressure and/or flow capacity, required tolerances and/or reliability, triggers, product requirements, functions, and/or behaviors. State options for a device represented by an object in executable block diagram 510 may include without limitation, active, passive, or piping. In other words, each stencil may have data associated with it that may be metadata that may be the basis of the execution essentials.

Piping may include any form of hardware connected to an object. Piping may connect two or more objects and allow transfer of a commodity, and/or a pressure among and/or between the objects. A commodity may include without limitation, a fluid and/or a gas and/or a composition thereof. Current stencil libraries, such as without limitation discussed in U.S. Pat. No. 10,389,458, may not have stencil shapes with associated and/or embedded execution essentials as required for the examples of the process and machine as described herein for a propulsion system and/or a fluid system.

After stencil shapes and execution essentials are created, a designer may draft a schematic for a design of the propulsion system and/or fluid system (operation 306). A designer may interface with the diagram and vector graphic application via a graphical user interface to generate a scalar vector graphic file representative of the schematic. An error check tool for the diagram and vector graphic application then runs an error check on the scalar vector graphic file generated by the diagram and vector graphic application (operation 308).

Responsive to the error check schematic and execution essentials table are then transformed into a scalar vector graphic file formatted such that the scalar vector graphic file retains and combines all the associated and/or embedded execution table execution essentials with each stencil of the schematic (operation 310). The associated and/or embedded execution table execution essentials with each stencil of the schematic are structured in a configuration easily manipulated during a runtime in a visualization application to present animated graphics. The data associated with each stencil may be metadata.

Responsive to the error check being error free, a novel and proprietary scan shapes tool runs specially programmed algorithms in a data extraction program on the schematic and execution essentials table that transforms them into novel resource files are then generated by in a scan shapes tool that reformats and transforms the execution essentials into traversal graph that contain at least a Translation table, an Object table, and a GangedMap table (operation 312). The scan shapes tool may be, without limitation, an application and/or program that resides in a processor in a support server that is specially programed to execute novel proprietary code of the data extraction program. Each of the Translation table, Object table, and GangedMap table are structured for access by and to reduce processing time for a visualization tool interfacing with a Propulsion and/or Fluid Server processing large data in visualizations of an executable block diagram of the propulsion and/or fluid system. Visualization tool may be without limitation as described by visualization tool 318 included in U.S. Pat. No. 10,389,458.

The newly formatted scalar vector graphic file is then loaded into a Display Server configured to process an executable block diagram simulation of virtual operations of the Propulsion and/or Fluid System (operation 314). The Display Server configured to process an executable block diagram simulation of virtual operations of the Propulsion and/or Fluid System may be associated with a graphical user interface configured to receive inputs from a designer and/or automated inputs. Without limitation, automated inputs may be generated by another computer processor.

The scalar vector graphic file is then run by the Display Server configured to process an executable block diagram simulation of virtual operations of the Propulsion and/or Fluid System (operation 314). The Display Server configured to process an executable block diagram simulation of virtual operations of the Propulsion and/or Fluid System may be configured to receive commands from a designer and/or automated inputs. The commands may stop and or start a run-time of the program. A Propulsion Server may also be in communication with the Display server to keep a log of every action with the virtual run of the executable block diagram simulation of virtual operations of the Propulsion and/or Fluid System, and provide snapback or reset capability for a run of the executable block diagram simulation of virtual operations of the Propulsion and/or Fluid System. Snapback and reset capabilities allow a design to amend the schematic, and thus the executable block diagram and simulation of virtual operations of the Propulsion and/or Fluid System to help identify alternate configurations and outcomes for alternative designs of the Propulsion and/or Fluid System.

Figure 5:
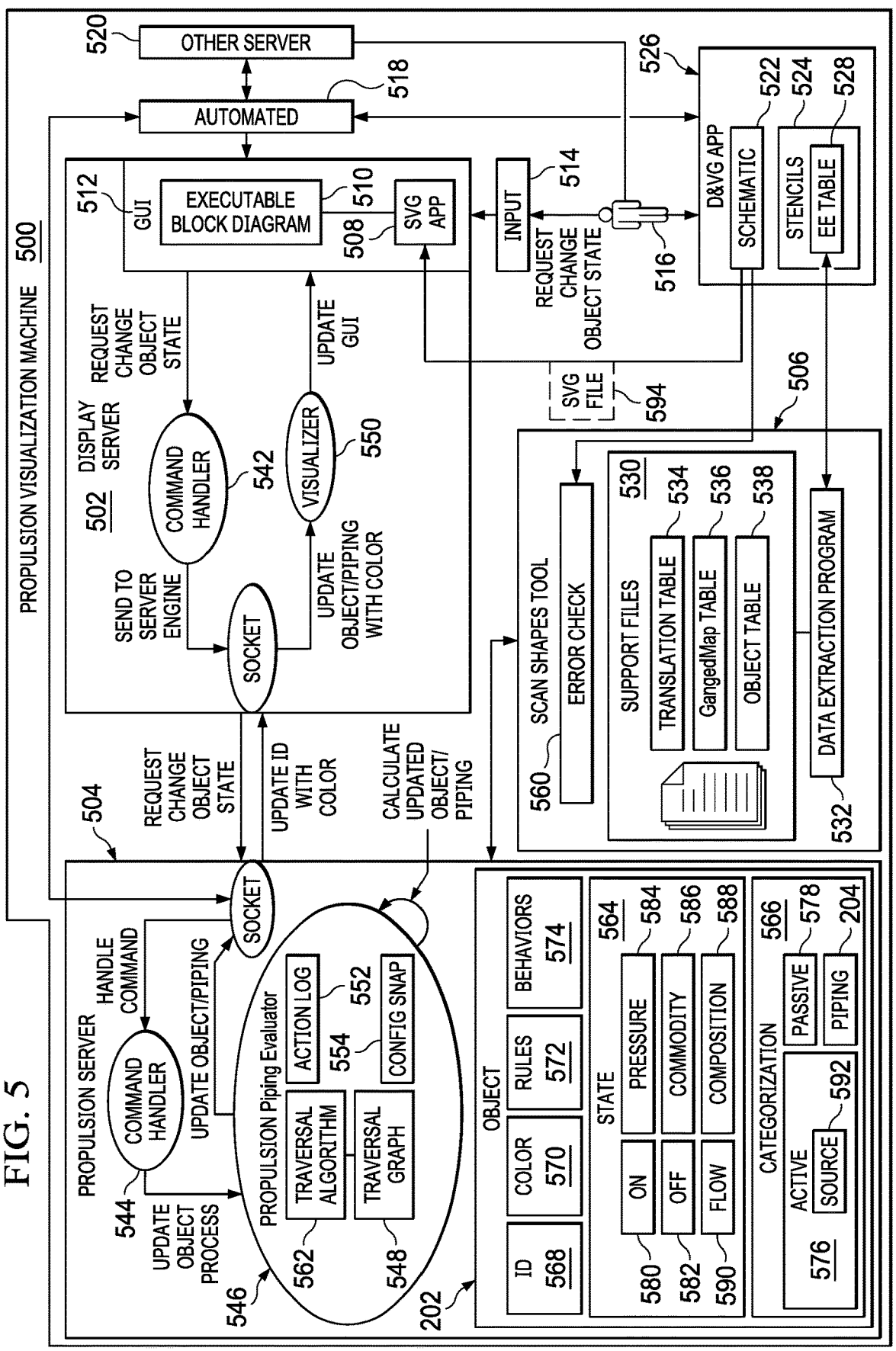
FIG. 5 is an illustration of a plan view of a block diagram of a modular construction of a propulsion visualization machine and process depicted in accordance with an illustrative example.

Thereby, a designer, such as without limitation user 516 as shown and discussed in FIG. 5, can perform critical up front verification and/or validation of proper valve open and close sequences for the design of the Propulsion and/or Fluid System represented by an executable block diagram in a visualization server for the original schematic of the design. This is expressly critical during the development of operation with satellite and/or rocket fuels that have tolerances that require precision in design, loading, and operation, and when testing delicate satellite and/or propulsion and/or fluid systems. The tool also allows for in-process tracking during operation of the propulsion and/or fluid systems. Further, the visualization tool provides a quality oversight with the ability to visually track the operations that are critical and/or require high precision and reliability, and intervene when undesired elements and/or performance become evident. Thereby, the novel machine and process allow propulsion operations and/or fluid system to be designed and validated in a virtual environment. Such novel capability provides and improvement to existing technology in processing data to analyze design and operation of propulsion and/or fluid systems that can recognize and greatly reduce and/or eliminate human error in the development, design, and review and/or operation of propulsion and/or fluid operations. Thereby by first time quality, reliability, and precision, of the design, development, analysis, testing, and operations and execution of a propulsion and/or a fluid system is achieved.

Figure 4:
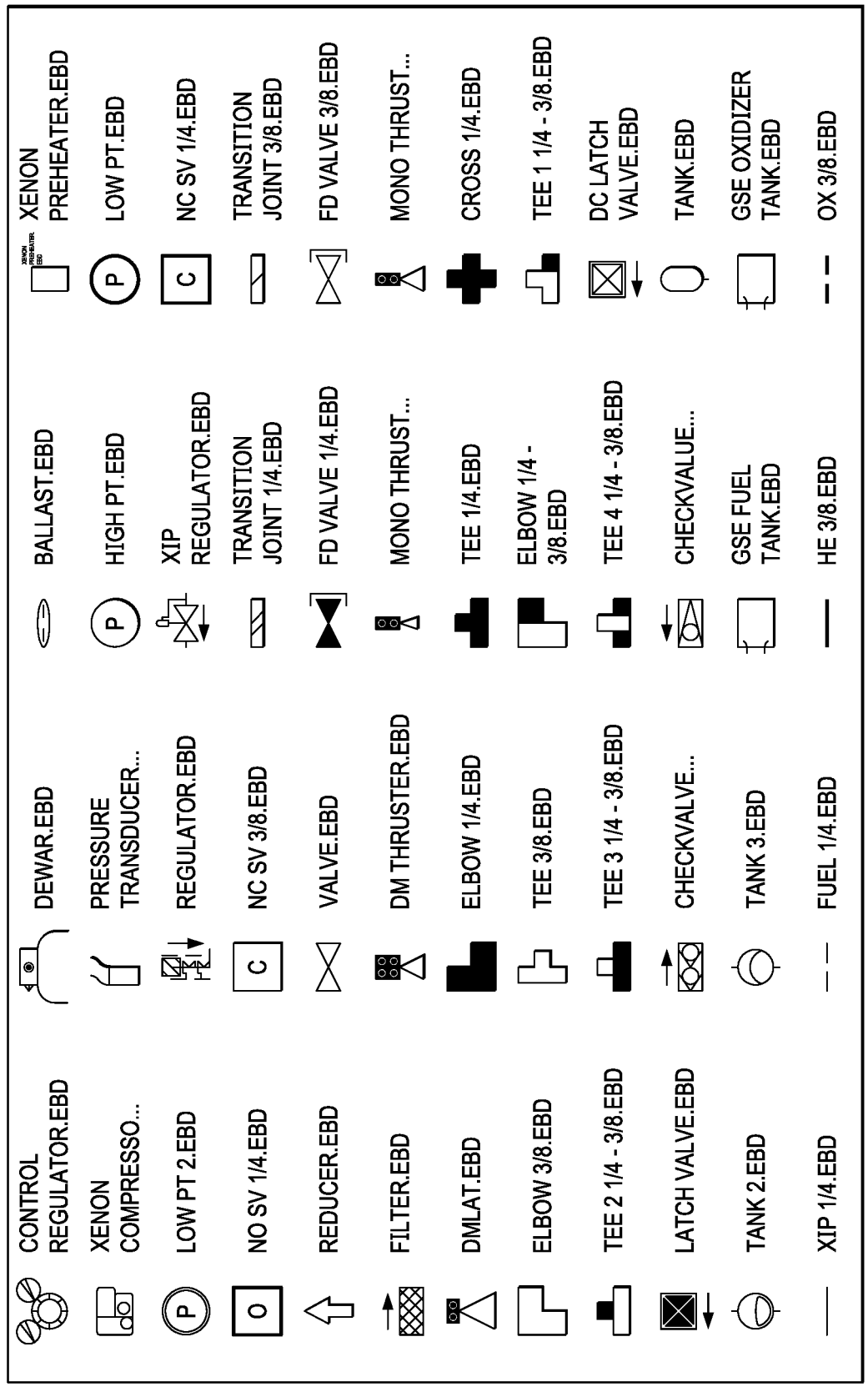
FIG. 4 is an illustration of an assortment of shapes customized for representation of various objects in a propulsion system depicted in accordance with an illustrative example.

Turning now to FIG. 4, an illustration of an assortment of shapes customized for representation of various objects in a propulsion system is depicted in accordance with an illustrative example. Each object may represent, without limitation, any component or device or unit that forms a part of the propulsion system and/or the fluid system. In view 400, each of the shapes may be a stencil for use by a designer assembling a schematic for a vector graphic application. Each stencil may be associated with and/or have embedded within its coding for the vector graphic application an execution table that holds execution essentials related to the object in the propulsion and/or fluid system represented by the stencil. Data associated with each stencil may be metadata. FIG. 4, is not meant to be a comprehensive or limiting collection of the stencils that may be created to represent objects in a design and/or operation of a propulsion and/or fluid system. without limitation the shapes in FIG. 4 may be examples of stencils 524 as shown in and described for FIG. 5.

As used herein, "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Turning now to FIG. 5, an illustration of a plan view of a block diagram of a modular construction of a propulsion visualization machine and process is depicted in accordance with an illustrative example. FIG. 5, shows Propulsion visualization machine 500 for development, evaluation, implementation, and/or testing of a propulsion and/or fluid system, such as without limitation Propulsion System 100 described in FIGS. 1-4. Propulsion visualization machine 500 may be called a visualization tool. Propulsion visualization machine 500 may be called a tool to provide a virtualization of a fluid and/or propulsion system such as without limitation, propulsion system 100. Propulsion visualization machine 500 facilitates a build process for assembly and visualization of a design of a propulsion and/or fluid system, and also facilitates a runtime process that virtualizes operational activity of the propulsion and/or fluid system and visualizes and allows evaluation, validation, and/or verification by test of at least flows and functional interactions and output of devices and piping of propulsion and/or fluid system, such as without limitation Propulsion System 100, represented by objects in executable block diagram 510. In other words, propulsion visualization machine 500 facilitates a process for building a virtual model of system test equipment supporting a fluid and/or flight propulsion system. Propulsion visualization machine 500 enables user 516 to interface with executable block diagram 510 and to verify requirements for reliable operations, while at the same time ensuring that test procedures are correct and that the steps are reliable and accurate.

Propulsion Visualization Machine 500 is constructed with modular components that include display server 502, propulsion server 504, and scan shapes tool 506. Display server 502 may include coding without limitation, in QT, C++, and/or JavaScript. Display server 502 includes scalar vector graphic application 508 configured to present and operate executable block diagram 510 by a graphical user interface 512. Graphical user interface 512 may be configured to receive input 514 from a user 516 and/or automated 518 inputs from some other server 520.

Without limitation, user 516 may be a designer who directs construction and/or amendment of schematic 522 using stencils 524 for diagram and vector graphic application 526. Hence, diagram and vector graphic application 526 may be a schematic construct tool. Without limitation, user 516 may be an engineer or a technician validating, analyzing, evaluating, or testing design, reliability, precision, and/or operating parameters of a propulsion system, such as without limitation propulsion system 100.

The modular configuration of components of Propulsion Visualization Machine 500 enables display server 502 to function independently. It also enables flexibility in command and control of propulsion server 504, through either direct interaction from user 516 with graphical user interface 512 or connecting to an external software application in other server 520 designed to command a particular portion of interest in propulsion server 504. Without limitation, propulsion server 504 may include coding in C#.

Similarly, graphical user interface 512 may be modularly configured with display server 502. Hence, graphical user interface 512 may be integrated as a modular part of display server 502 as shown in FIG. 5. Alternatively, graphical user interface 512 may be a physically separate module from display server 502 that is associated with and in communication with display server 502, and thus with propulsion server 504, scan shapes tool 506, other server 420, and diagram and vector graphic application 526.

Likewise, vector graphic application 526 may be physically separated from graphical user interface 512 but in association and communication therewith, as shown in FIG. 5. Alternatively, vector graphic application 526 may reside within display server 512 and may even be located as well within graphical user interface 512. Graphical user interface 512 may include a display, data processing system—such as, without limitation described by FIG. 7, and/or an input device.

Scan shapes tool 506 contains error check 560 which is a program that checks for errors in schematic 522. Errors found and highlighted by error check 560 may include without limitation faulty continuity or incompatibility between components connected in schematic 522, and/or missing execution essentials for an object in a diagram and vector graphic application 526 generated scalar vector graphic file of schematic 522. Responsive to an error free error check 560, data extraction program 532 of scan shapes tool 506 generates support files 530 from execution essentials table 528 associated with objects in schematic 522.

Stencils 524 are associated with and/or contain an, as shown in FIG. 5 without limitation, embedded execution essentials table 528 that provides metadata to be transformed into support files 530 by data extraction program 532 within scan shapes tool 506 mining from diagram and vector graphic application 526. Stencils are associated with data associated with the device they represent for the fluid and/or propulsion system. Metadata may include without limitation: a component type, a connection and/or connections, and/or a property, specific to each respective object represented by a stencil in stencils 524. FIG. 4 illustrates a non-limiting example of shapes that may be used for stencils 524.

Stencils 524 are novel and distinct from stencils available to current schematic construct tools at least in that they are tailored specifically to represent all components of a propulsion system, such as without limitation propulsion system 100. Likewise, for the case where FIG. 5 may be transformed to depict a fluid system (where all uses of the "propulsion" term in FIG. 5 are replaced with the term "fluid," stencils 524 are novel and distinct from stencils available to current schematic construct tools at least in that they are tailored specifically to represent all components of a fluid system. It follows then that resultant schematic 522 using stencils 524, as well as a resultant scalar vector graphic (SVG) file and executable block diagram 510 may also contain novel objects tailored specifically to represent components of a propulsion and/or fluid system associated with the novel stencils.

Support files 530 include at least novel: Translation table 534, GangedMap table 536, and Object Table 538 generated and formatted by specially programmed proprietary algorithms within data extraction program 532 in scan shapes tool 506. Scan shapes tool 506 may be a separate server from propulsion server 504, but in communication therewith as shown in FIG. 5. Without limitation scan shapes tool 506 may be in communication with propulsion server 504 at least via an ethernet connection. Alternative to the relationship illustrated in FIG. 5, scan shapes tool 506 may be incorporated within propulsion server 504 as an integrated component thereof.

Support files 530 serve as a relational database and contain unique information for each and every stencil (such as without limitation those shown if FIG. 4) in stencils 524 or object in the schematic. The specially programed algorithms coded within data extraction program 532 are configured to identify unit tags for each object in schematic 522 and then correlate the object information to a schematic location for visualization. Unit tags may be metadata in execution essentials table 528 associated with objects in schematic 552 and readable by data extraction program 532. Metadata may include without limitation: a component type, a connection and/or connections, and/or a property, specific to each respective object represented by a stencil in stencils 524. A component may be a device in a fluid and/or propulsion system, such as without limitation propulsion system 100.

Support files 530 are configured to, and in operation do, serve as an address book for command handler 538 and propulsion piping evaluator 546 in propulsion server 504 to look up directions that improve efficiency for a traversal algorithm processing. Translation table 534 is a specially programed file configured to, and in operation that does, serve as a lookup table that contains information for every object of the propulsion system represented in schematic 522. This information includes without limitation, a unique identification, a unit type, a number of ports/connections on the object.

GangedMap table 536 is a specially programmed file configured to, and in operation that does, serve as a lookup table that identifies every connection between objects in schematic 522. Connections may be piping between objects, or any object that carries a commodity and/or transfers a pressure from one object to another. In other words, without limitation GangedMap table 536 details every unit at a beginning and/or ending of any piping in schematic 522, and thus executable block diagram 510 representing a propulsion system, such as without limitation propulsion system 100 as shown and discussed in FIG. 1. Object Table 538 is a specially programed file configured to, and in operation that does, serve as an index file that identifies a specific page an object is located on in a collection of pages of GangedMap table 536 and of Translation table 534.

Traversal graph 530 improves processing capacity of propulsion server 504. Without support files 530, propulsion server 504 could not build novel traversal graph 548 that enables propulsion server 504 to receive and process hundreds of batched commands through to update an image on graphical user interface 512 without freezing-up displays on graphical user interface 512. With the technological improvement in processing capability provided by traversal graph 548, propulsion server 504 is able to receive and process 200 commands in a single batch with no degradation of displays updating on graphical user interface 512. In other words, propulsion piping evaluator 546 creates a runtime traversal graph 548 by using support files 530. Support files 530 may be flat files prebuilt from an individual stencil object within stencils 524. Separate processing by propulsion server 504 and display server 502 helps to handle mass update of executable block diagram 510 on graphical user interface 512 without freezing up the display. An algorithm within propulsion piping evaluator 546 recursively updates a status and/or categorization for each object and all piping in executable block diagram 510 for propulsion system 100.

Other server 520 may be part of an external command and control system that may send automated 518 inputs directly to propulsion server 504. Automated 518 inputs may send a request and/or command to change a state of an object represented in executable block diagram 510. Other server 520 may act independently from user 516 and/or may be responsive to interactions with user 516. As a non-limiting example, Other server 520 may be a modular test executive feeding batches of commands to propulsion server 504. Without limitation, other server 520 may also represent programs that may send automated 518 inputs to diagram and vector graphic application 526.

Hence, propulsion piping evaluator 546 receives commands to update object and piping states and processes within executable block diagram 510 on graphical user interface 512 from command handler 544. Specially programed code within propulsion piping evaluator 546 then calculates updates to states of each object or piping shown in executable block diagram 510 and associated categorizations, IDs, and display colors for each object and piping shown on executable block diagram 510. The updates are transmitted though the socket of propulsion server 504 to the socket of display server 502 and on to visualizer 550. Visualizer 550 formats the updates for reception and animation and/or display on graphical user interface 512. In other words, Visualizer" 502 is a program logic which takes a command "Update ID with Color" and makes it display on the executable block diagram 510 on graphical user interface 512. Hence, therefrom the display server updates an indication of the state of the object on executable block diagram 510 as well as the color code for the object and the color code for the piping on executable block diagram 510.

Thereby, propulsion visualization machine 500 and processes run thereon provide for verifying a receipt or an absence of a simulated fluid, pressure, and/or compositions thereof in connections to a destination object; and responsive to the absence, identifying a particular connection at which an error occurred in the receipt of the fluid, pressure, and/or compositions thereof, and identifying the particular connection and a particular virtual module respectively connected to and including the particular connection.

Thus, propulsion visualization machine 500 provides a technological improvement over previous visualization systems at least in providing the machine and process whereby input 514 may be received by propulsion server 504 from interaction through graphical user interface 512. Propulsion server 504 is configured such that in operation, propulsion server 504 receives input 514 through graphical user interface 512 and command handler 542 in display server 502. Without limitation, input 514 may be a request to change a state of an object in executable block diagram 510. Command handler 542 may transform input 514 into a command that is readable by propulsion server 504.

Propulsion server 504 is configured such that in operation, propulsion server 504 receives command from display server 502 and command handler 544 within propulsion server 504 feeds command, such as without limitation a command to update a state of an object represented in executable block diagram 510, and feed the command to propulsion piping evaluator 546. propulsion piping evaluator 546 represents a section of propulsion server 504 that includes proprietary specially programmed algorithms that improve previous technology of servers in order to allow propulsion server 504 to provide a real-time animated visual display on graphical user interface 512 of a status of each object of a propulsion system, such as without limitation propulsion system 100 from FIG. 1, of the system in operation, and in a snapshot at any selected point in time for the operation.

Further, propulsion server 504 is configured such that in operation, propulsion server 504 provides a capability through graphical user interface 512 to visually validate any command sent to any object in a propulsion system, such as without limitation propulsion system 100. Visual validation may be of any individual command issued as input 514 to graphical user interface 512, and/or of automated 518 inputs, such as without limitation a visual modular test system, hosted in other server 520.

Proprietary specially programmed algorithms in propulsion server 504 are also configured to and in operation do, categorize each object present in executable block diagram 510 for propulsion system 100. The categorization of the objects provided by propulsion server 504 allows for customization of rules and behaviors executed by each object of propulsion system 100 represented in executable block diagram 510.

Categories assigned to each object may include active, passive, and piping. An "active" categorization defines an object in executable block diagram 510 that may trigger a change in a state of another object in executable block diagram 510. An active categorization defines an object in executable block diagram 510 that has states of "on" or "off" and/or a more complex property state that may include without limitation, a pressure, a commodity type, or a composition. one of ordinary skill in the art understands that the propulsion visualization machine 500 provides a virtualization that simulates operation of a fluid and/or propulsion system such as without limitation propulsion system 100. Hence, as discussed for executable block diagram 510 presented on graphical user interface 512 references to a pressure, a commodity type, and/or a composition refer to simulation thereof—not actual values present on functioning physical hardware. An active object may be an origination point of all property state values for objects in executable block diagram 510. An object may be interactive. An interactive object in executable block diagram 510 may trigger a change in a state of a downline object in the propulsion system presented in executable block diagram 510.

A "passive" categorization defines an object in executable block diagram 510 that is not "active" and is not piping. Each object categorized as passive may be a pass-thru device or may have a unique set of rules and/or behaviors which may affect a characteristic such as without limitation, a pressure and/or a composition of a commodity and/or fluid as it passes on to a next object. In other words, an object categorized as "passive" is configured to, and in operation may, change a pressure and/or a state of a commodity in propulsion system 100.

A "piping" categorization defines an object in executable block diagram 510 that connects one object to another object. In other words, an object categorized as "piping" is configured to, and in operation does, transfer a pressure or a commodity from one object on to another object.

Figure 6:
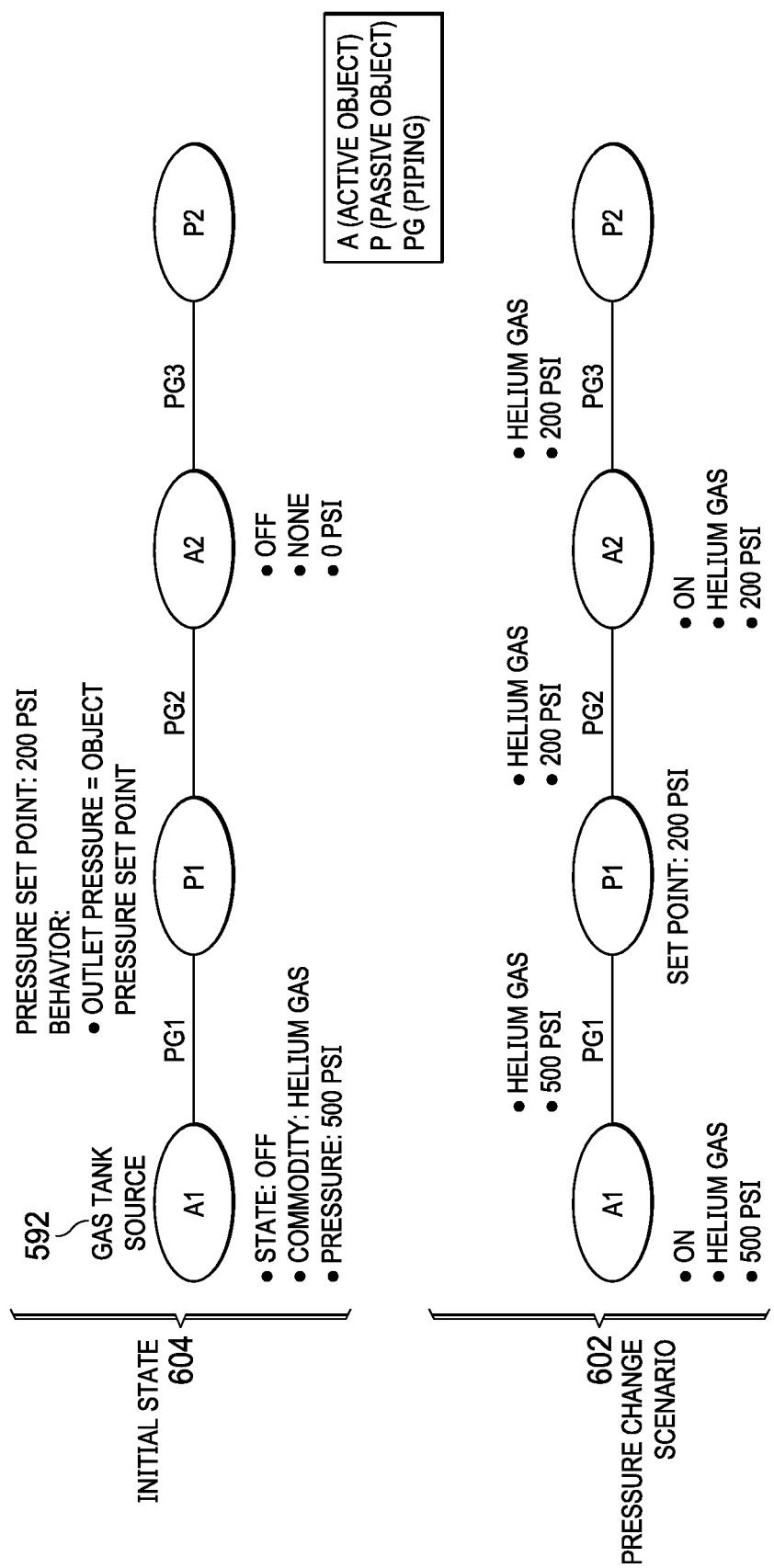
FIG. 6 is an illustration of a nodal representation of a change in a traversal graph in a propulsion server depicted in accordance with an illustrative example.

Novel algorithms of propulsion piping evaluator 546 contain rules that provide propulsion server 504 a novel capacity to form traversal graph 548 configured to, and that in operation does, access support files 530 to track a state of every object in executable block diagram 510. Logic for rules in support files 530 is based upon a state, respectively, of each object categorized as active and a unique behavior definition assigned respectively to each object categorized as passive. FIG. 6 will present an example of a traversal graph 548 shift during a runtime of propulsion server 504 controlling executable block diagram 510 for a propulsion system, such as without limitation propulsion system 100.

In other words, propulsion piping evaluator 546 has algorithms of specially programed code that, during an initialization phase, build traversal graph 548 by correlating values in Translation table 534, GangedMap table 536, and Object table 538. Once initialized, and during a runtime response to an input, command handler 544 may request propulsion piping evaluator 546 to change the state of an object. Propulsion piping evaluator 546 will then traverse through traversal graph 548 and update all related objects as required by the input. Propulsion piping evaluator 546 then generates a newly formed "update ID with color" list of commands that it sends on to visualizer 550. Using "update ID with color" list of commands, Visualizer 550 updates executable block diagram 510 presentation on graphical user interface 512.

Propulsion piping evaluator 546 is configured to, and in operation does, calculate new state for each node of traversal graph 548 used to formulate an update for an object and/or objects in executable block diagram 510. Propulsion server 504 transfers the update for an object and/or objects in executable block diagram 510 through sockets to visualizer 550 in display server 502. Visualizer 550 is configured to, and in operation does, transform update from propulsion piping evaluator 546 for updating images of executable block diagram 510 displayed on graphical user interface 512 running scalar vector graphic application 508.

Update may include a change of state of an object(s) in executable block diagram 510 which may be visualized without limitation, by a change of color of the object(s) displayed for the object(s) in executable block diagram 510. Visualization of the object(s) changed in executable block diagram 510 from update may include piping between other objects displayed in executable block diagram 510 on graphical user interface 512.

In FIG. 5, the arrows within and between display server 502 and propulsion server 504 illustrate the process executed during a runtime that visualizes on executable block diagram 510 performance of propulsion system 100 in operation. Additionally, propulsion piping evaluator 546 improves over current processing capability for visualization processing for a fluid and/or propulsion system by incorporating action log 552 and configuration snapshot 554 features. Action log 552 records with a date/timestamp every activity and change to executable block diagram 510 during runtime processing of modeling for propulsion system 100 directed through propulsion server 504 and display server 502. In other words, action log 552 is configured to record all activities that transpire in the block diagram. Thereby, action log 552 of all activities during a runtime on executable block diagram 510 allows for rolling back actions of propulsion system 100 as indicated on executable block diagram 510 to a desired prior point in the runtime simulation of propulsion system 100 in operation. Further, action log 552 of all activities during a runtime on executable block diagram 510 provides for establishing a starting condition for a new runtime on executable block diagram 510 by propulsion visualization machine 500.

Special programming for action log 552 and propulsion piping evaluator 546 improve visualization technology for a fluid and/or propulsion system, such as propulsion system 100 by allowing a rollback to a desired previous condition in a runtime of a simulation by executable block diagram 510 of operations representing actual performance of propulsion system 100. Thereby, if any undesired or unintended changes or outcomes become apparent in executable block diagram 510 on graphical user interface 512 during the runtime, the runtime may be halted, changes made to the design of or conditions and/or states within executable block diagram 510, and the runtime restarted. Thereby, a full reset or new session for the simulation runtime is not required and may be avoided. Thereby, both design, validation, and/or test time and expense may be reduced.

Further, action log 552 for a runtime may be used to select a previously achieved point as a starting point for a new session for design, validation, and/or test of propulsion system 100. As well, configuration snapshot 554 feature is configured to, and in operation does, provide a capability to take and record a snapshot of the current state and related values, such as without limitation pressure, commodity, and/or composition, associated with each object represented in executable block diagram 510. In other words, configuration snapshot 554 taken in a runtime for executable block diagram 510 at a selected time records a state of all valves in a fluid and/or propulsion system, such as without limitation propulsion system 100, presented in executable block diagram 510 therefor.

A state of an object may include without limitation a position of a valve. Configuration snapshot 554 record of a state/values for each object represented in executable block diagram 510 may be used at least to support engineers with design, planning, development, and/or test of a fluid and/or propulsion system, such as propulsion system 100.

Turning now to FIG. 6, an illustration of a nodal representation of a change in a traversal graph in a propulsion server is depicted in accordance with an illustrative example. Nodal representation 600 of traversal graph 548 in propulsion server 504 shows a change in state for objects A1 and A2 categorized as active, P1 and P2 categorized as passive, and connecting pipings Pg1, Pg2, and Pg3 for pressure change scenario 602 responsive to input 514 changing initial state 604 from the state of object A1 being off to being on.

Figure 7:
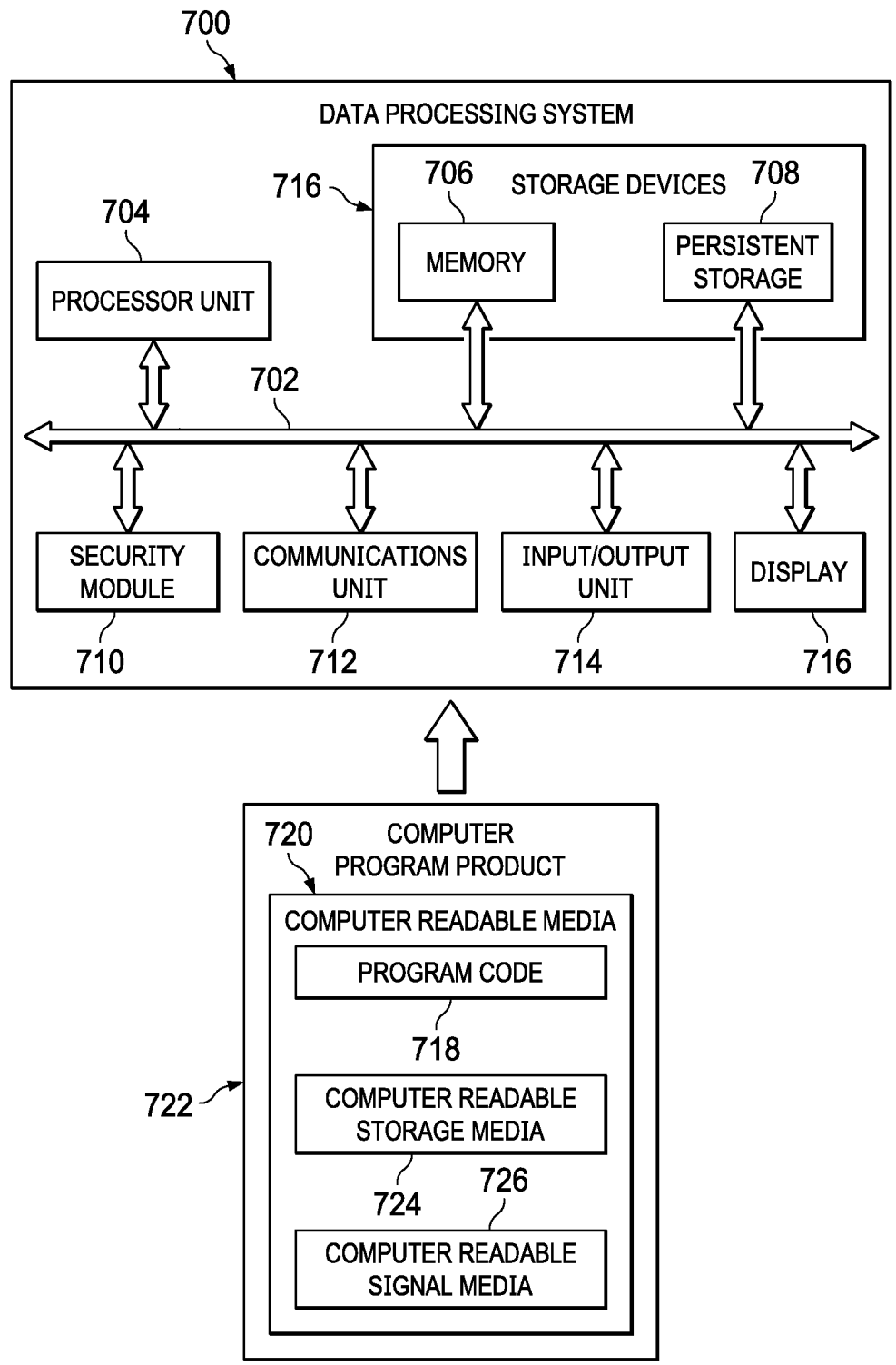
FIG. 7 is an illustration of a block diagram of a data processing system depicted in accordance with an illustrative embodiment.

With reference now to FIG. 7, an illustration of a block diagram of a data processing system is depicted in accordance with an illustrative embodiment. Data processing system 700 is an example of a computer, such as without limitation propulsion server 504 in FIG. 5, in which computer-readable program code or instructions implementing the digital certificate and key management processes of illustrative embodiments may be located. In this example, data processing system 700 includes communications fabric 702, which provides communications between processor unit 704, memory 706, persistent storage 708, hardware security module 710, communications unit 712, input/output (I/O) unit 714, and display 716.

Processor unit 704 serves to execute instructions for software applications and programs that may be loaded into memory 706. Processor unit 704 may be a set of one or more hardware processor devices or may be a multi-core processor, depending on the particular implementation.

Memory 706 and persistent storage 708 are examples of storage devices 718. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 706, in these examples, may be, for example, a random-access memory (RAM), or any other suitable volatile or non-volatile storage device, such as a flash memory. Persistent storage 708 may take various forms, depending on the particular implementation. For example, persistent storage 708 may contain one or more devices. For example, persistent storage 708 may be a disk drive, a solid-state drive, a rewritable optical disk, a rewritable magnetic tape, or some combination of the above. The media used by persistent storage 708 may be removable. For example, a removable hard drive may be used for persistent storage 708.

Hardware security module 710 is a physical computing device that safeguards and manages cryptographic keys and performs encryption and decryption functions for digital signatures. In this example, hardware security module 710 is a plug-in card. Alternatively, hardware security module 710 is an external device coupled to data processing system 700. Hardware security module 710 contains a set of secure cryptoprocessor chips.

Hardware security module 710 enables protection of secure data that is in transit via a network, that may include display server 502, by providing exclusive control of cryptographic private keys corresponding to an enterprise across a heterogeneous distributed computing environment, such as a hybrid multi-cloud and edge environment comprised of a plurality of clouds corresponding to different cloud providers and a plurality of edge devices. The cryptographic private keys are generated within and never leave a security boundary of hardware security module 710 for an entire lifecycle of the keys.

As a result, data processing system 700 operates as a special purpose computer system in which hardware security module 710 in data processing system 700 may enable secure management of digital certificates and keys across a hybrid multi-cloud and edge environment. In particular, hardware security module 710 may transform data processing system 700 into a special purpose computer system as compared to currently available general computer systems that do not have hardware security module 710.

Communications unit 712, in this example, provides for communication with other computers, data processing systems, and devices via a network, which may include without limitation, display server 502. Communications unit 712 may provide communications through the use of both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 700.

Input/output unit 714 allows for the input and output of data with other devices that may be connected to data processing system 700. Sockets shown in FIG. 5 may be a part of input/output unit 714. For example, input/output unit 714 may provide a connection for user input through a keypad, a keyboard, a mouse, a microphone, and/or some other suitable input device. Display 716 provides a mechanism to display information to a user and may include touch screen capabilities to allow the user to make on-screen selections through user interfaces or input data, for example.

Instructions for the operating system, applications, and/or programs may be located in storage devices 718, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented instructions, which may be located in a memory, such as memory 706. These program instructions are referred to as program code, computer usable program code, or computer-readable program code that may be read and run by a processor in processor unit 704. The program instructions, in the different embodiments, may be embodied on different physical computer-readable storage devices, such as memory 706 or persistent storage 708.

Program code 720 is located in a functional form on computer-readable media 722 that is selectively removable and may be loaded onto or transferred to data processing system 700 for running by processor unit 704. Program code 720 and computer-readable media 722 form computer program product 724. In one example, computer-readable media 722 may be computer-readable storage media 726 or computer-readable signal media 728.

In these illustrative examples, computer-readable storage media 726 is a physical or tangible storage device used to store program code 720 rather than a medium that propagates or transmits program code 720. Computer-readable storage media 726 may include, for example, an optical or magnetic disc that is inserted or placed into a drive or other device that is part of persistent storage 708 for transfer onto a storage device, such as a hard drive, that is part of persistent storage 708. Computer-readable storage media 726 also may take the form of a persistent storage, such as a hard drive, a thumb drive, or a flash memory that is connected to data processing system 700.

Alternatively, program code 720 may be transferred to data processing system 700 using computer-readable signal media 728. Computer-readable signal media 728 may be, for example, a propagated data signal containing program code 720. For example, computer-readable signal media 728 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 722" can be singular or plural. For example, program code 720 can be located in computer-readable media 722 in the form of a single storage device or system. In another example, program code 720 can be located in computer-readable media 722 that is distributed in multiple data processing systems. In other words, some instructions in program code 720 can be located in one data processing system while other instructions in program code 720 can be located in one or more other data processing systems. For example, a portion of program code 720 can be located in computer-readable media 722 in a server computer while another portion of program code 720 can be located in computer-readable media 722 located in a set of client computers.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 720.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

It is understood that a cloud computing, implementation of the teachings recited herein may be used, although the teachings are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional.

Figure 8:
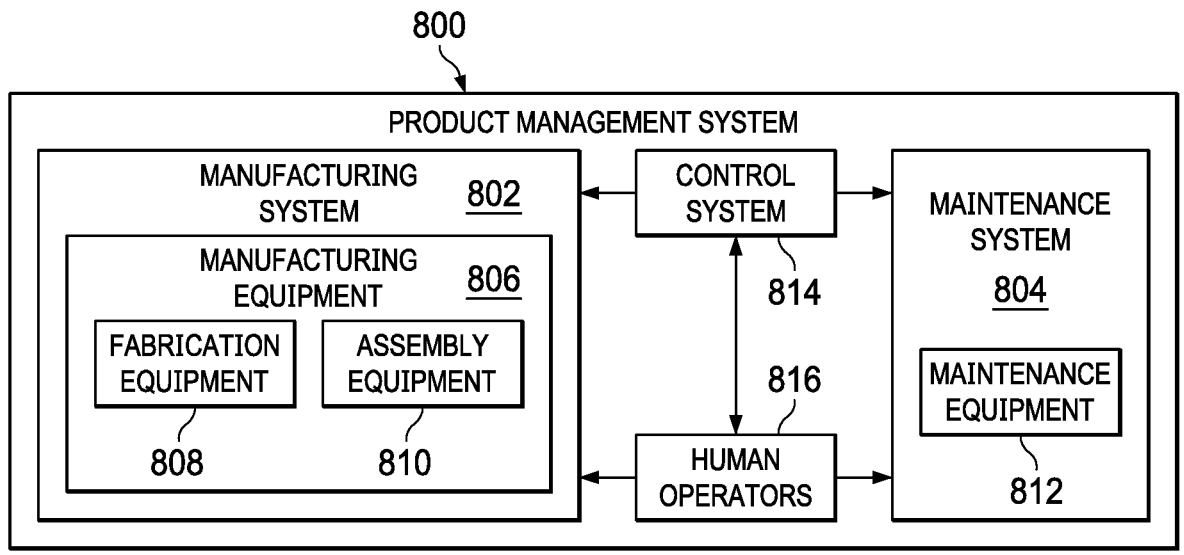
FIG. 8 is an illustration in a form of a block diagram of a product management system depicted in accordance with an illustrative embodiment.

Turning now to FIG. 8, an illustration in a form of a block diagram of a product management system is depicted in accordance with an illustrative embodiment. Product management system 800 is a physical hardware system. In this illustrative example, product management system 800 includes at least one of manufacturing system 802 or maintenance system 804.

Manufacturing system 802 is configured to manufacture products. Manufacturing system 802 may be used to manufacture propulsion visualization machine 500 and/or a fluid and/or propulsion system designed, validated, and/or tested/evaluated by propulsion visualization machine 500. As depicted, manufacturing system 802 includes manufacturing equipment 806. Manufacturing equipment 806 includes at least one of fabrication equipment 808 or assembly equipment 810.

Fabrication equipment 808 is equipment that may be used to fabricate propulsion visualization machine 500 and or a fluid and/or propulsion system designed, validated, and/or tested/evaluated by propulsion visualization machine 500. Multiple copies or multiple versions of propulsion visualization machine 500 and/or a fluid and/or propulsion system designed, validated, and/or tested/evaluated by propulsion visualization machine 500 can be fabricated.

Fabrication equipment 808 can be used to fabricate a number of different structures. For example, fabrication equipment 808 can be used to fabricate propulsion visualization machine 500 and/or a fluid and/or propulsion system designed, validated, and/or tested/evaluated by propulsion visualization machine 500, or any components thereof or of the fluid and/or propulsion system, such as without limitation propulsion system 100, and other components described in FIGS. 1-7.

Assembly equipment 810 is equipment used to assemble parts to form a product such as a propulsion visualization machine 500 and/or a fluid and/or propulsion system designed, validated, and/or tested/evaluated by propulsion visualization machine 500, a computer, an aircraft, or some other product. Assembly equipment 810 also can include machines and tools. These machines and tools may be without limitation at least one of a robotic arm, a spinner system, a sprayer system, an elevator system, a rail-based system, or a robot.

In this illustrative example, maintenance system 804 includes maintenance equipment 812. Maintenance equipment 812 can include any equipment needed to perform maintenance on and evaluation of a product. Maintenance equipment 812 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 812 may include optical inspection devices, x-ray imaging systems, surface-profile measurement systems, drills, vacuum leak checkers, electrical continuity checkers, display and/or interface analysis and correction tools, computer software and hardware, and other suitable devices. In some cases, maintenance equipment 812 can include fabrication equipment 808, assembly equipment 810, or both to produce and assemble parts that needed for maintenance.

Product management system 800 also includes control system 814. Control system 814 is a hardware system and may also include software or other types of components. Control system 814 is configured to control the operation of at least one of manufacturing system 802 or maintenance system 804. In particular, control system 814 can control the operation of at least one of fabrication equipment 808, assembly equipment 810, or maintenance equipment 812.

The hardware in control system 814 can be implemented using hardware that may include computers, circuits, networks, and other types of equipment. The control may take the form of direct control of manufacturing equipment 806. For example, robots, computer-controlled machines, and other equipment can be controlled by control system 814. In other illustrative examples, control system 814 can manage operations performed by human operators 816 in manufacturing or performing maintenance on a product. For example, control system 814 can assign tasks, provide instructions, display models, or perform other operations to manage operations performed by human operators 816. In these illustrative examples, the different processes for fabricating propulsion visualization machine 500 and/or a fluid and/or propulsion system designed, validated, and/or tested/evaluated by propulsion visualization machine 500 through suitable devices can be manufactured using processes implemented in control system 814.

In the different illustrative examples, human operators 816 can operate or interact with at least one of manufacturing equipment 806, maintenance equipment 812, or control system 814. This interaction can occur to manufacture propulsion visualization machine 500 and/or a fluid and/or propulsion system designed, validated, and/or tested/evaluated by propulsion visualization machine 500, or other components for use in products such as aircraft, spacecraft, communications systems, computation systems, and sensor systems.

Further, control system 814 can be used to adjust manufacturing of propulsion visualization machine 500 and/or a fluid and/or propulsion system designed, validated, and/or tested/evaluated by propulsion visualization machine 500 dynamically during the manufacturing process. For example, many points in the process, of fabricating the propulsion visualization machine 500 and/or a fluid and/or propulsion system designed, validated, and/or tested/evaluated by propulsion visualization machine 500, as well as other components, are present at which adjustments can be made to control characteristics of components in propulsion visualization machine 500 and/or a fluid and/or propulsion system designed, validated, and/or tested/evaluated by propulsion visualization machine 500.

Figure 9:
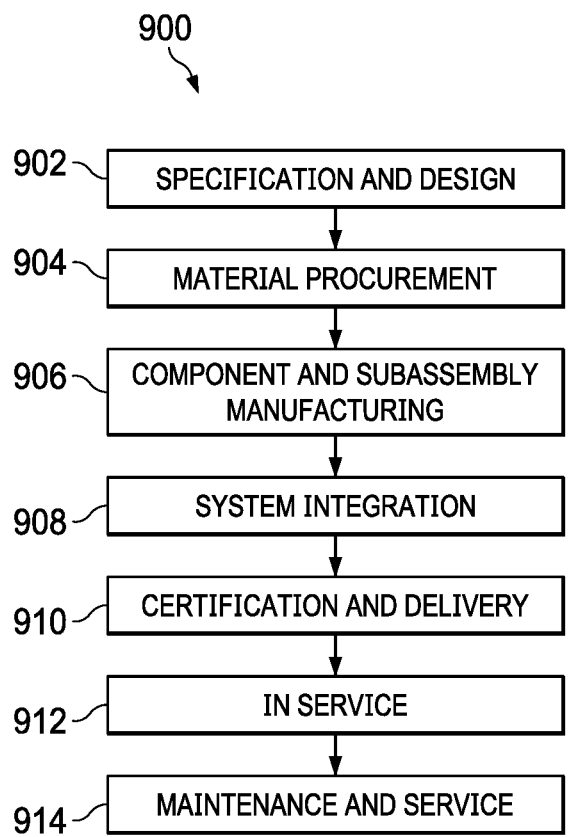
FIG. 9 is an illustration in a form of a block diagram of a manufacturing and service process depicted in accordance with an illustrative example.

Illustrative examples of the present disclosure may be described in the context of a manufacturing and service process 900 as shown in FIG. 9 for propulsion visualization machine 500 and/or a fluid and/or propulsion system designed, validated, and/or tested/evaluated by propulsion visualization machine 500, such as without limitation propulsion system 100. Turning to FIG. 9, an illustration in a form of a block diagram of a manufacturing and service process is depicted in accordance with an illustrative example. During pre-production, manufacturing and service process 900 may include specification and design 902 of propulsion visualization machine 500 and/or a fluid and/or propulsion system designed, validated, and/or tested/evaluated by propulsion visualization machine 500, such as without limitation propulsion system 100 and material procurement 904.

During production, component and subassembly manufacturing 906 and system integration 908 of propulsion visualization machine 500 and/or a fluid and/or propulsion system designed, validated, and/or tested/evaluated by propulsion visualization machine 500, such as without limitation propulsion system 100 takes place. Thereafter, propulsion visualization machine 500 and/or a fluid and/or propulsion system designed, validated, and/or tested/evaluated by propulsion visualization machine 500, such as without limitation propulsion system 100 may go through certification and delivery 910 in order to be placed in service 912. While in service 912 by a customer, propulsion visualization machine 500 and/or a fluid and/or propulsion system designed, validated, and/or tested/evaluated by propulsion visualization machine 500, such as without limitation propulsion system 100 may be scheduled for routine maintenance and service 914, which may include modification, reconfiguration, refurbishment, or other maintenance and service.

Each of the processes of manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operations 902 through operation 914 may be optional.

The flowcharts and block diagrams in the different depicted examples above illustrate the architecture, functionality, and operation of some possible implementations of a machine and a process in an illustrative example. In this regard, each block in the flowcharts or block diagrams may represent at least one of a module, a segment, a function, or a portion of an operation or step.

As noted above, all Figures and descriptions above apply to propulsion visualization machine 500 as one example for the larger class of fluid systems. Therefore, the description of components and technological improvements for propulsion visualization machine 500 may be more broadly applied to enhance capabilities for a fluid visualization machine. In other words, all components and concepts described above for a propulsion system, such as without limitation propulsion system 100 may equally be applied to other fluid systems. In other words, in all Figures and descriptions, the term "fluid" may replace the term "propulsion" with equal fidelity.

Figure 10:
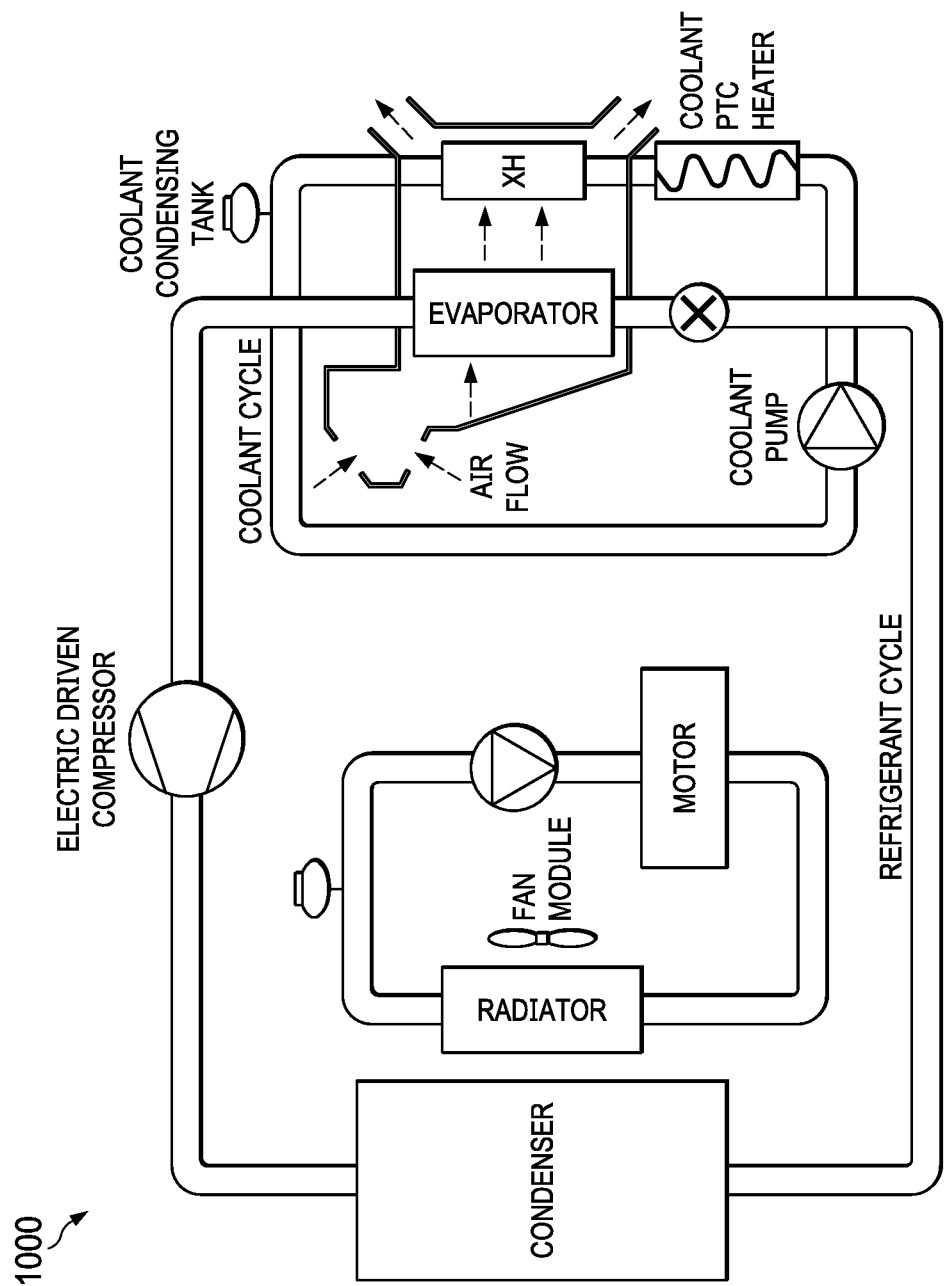
FIG. 10 is an illustration of a thermal management system schematic depicted in accordance with an illustrated example.

FIG. 10 is presented as a non-limiting example of a fluid system other than a propulsion system. FIG. 10 is an illustration of a thermal management system schematic depicted in accordance with an illustrated example. FIG. 10 is presented to show a non-limiting alternative to schematic shown in FIG. 1 for propulsion system 100. Just as FIGS. 2-9 flow from and are related to propulsion system 100, they could equally flow from and similarly relate to a schematic such as shown in FIG. 10 for thermal management system 1000. As such, all components and concepts described above for a propulsion system, such as without limitation propulsion system 100 may equally be applied to thermal management system 1000, wherein the term propulsion in the examples above would be replaced by the term "thermal management".

Similar figures for FIG. 10 might have been chosen from among without limitation, a schematic for a hydro-electric system, an oil refinery, a fluid control system on a space or marine vehicle, or even a fluid distribution system in a high-rise building, as equivalent alternative fluid systems. FIGS. 2-9 could equally flow from and similarly relate to a schematic such as shown in FIG. 10 for other than thermal management system 1000. As such, all components and concepts described above for a propulsion system, such as without limitation propulsion system 100 may equally be applied to alternative fluid systems, wherein the term "propulsion" in the examples above would be replaced by appropriate terms from an alternative fluid system, such as without limitation "refinery".

Figure 11:
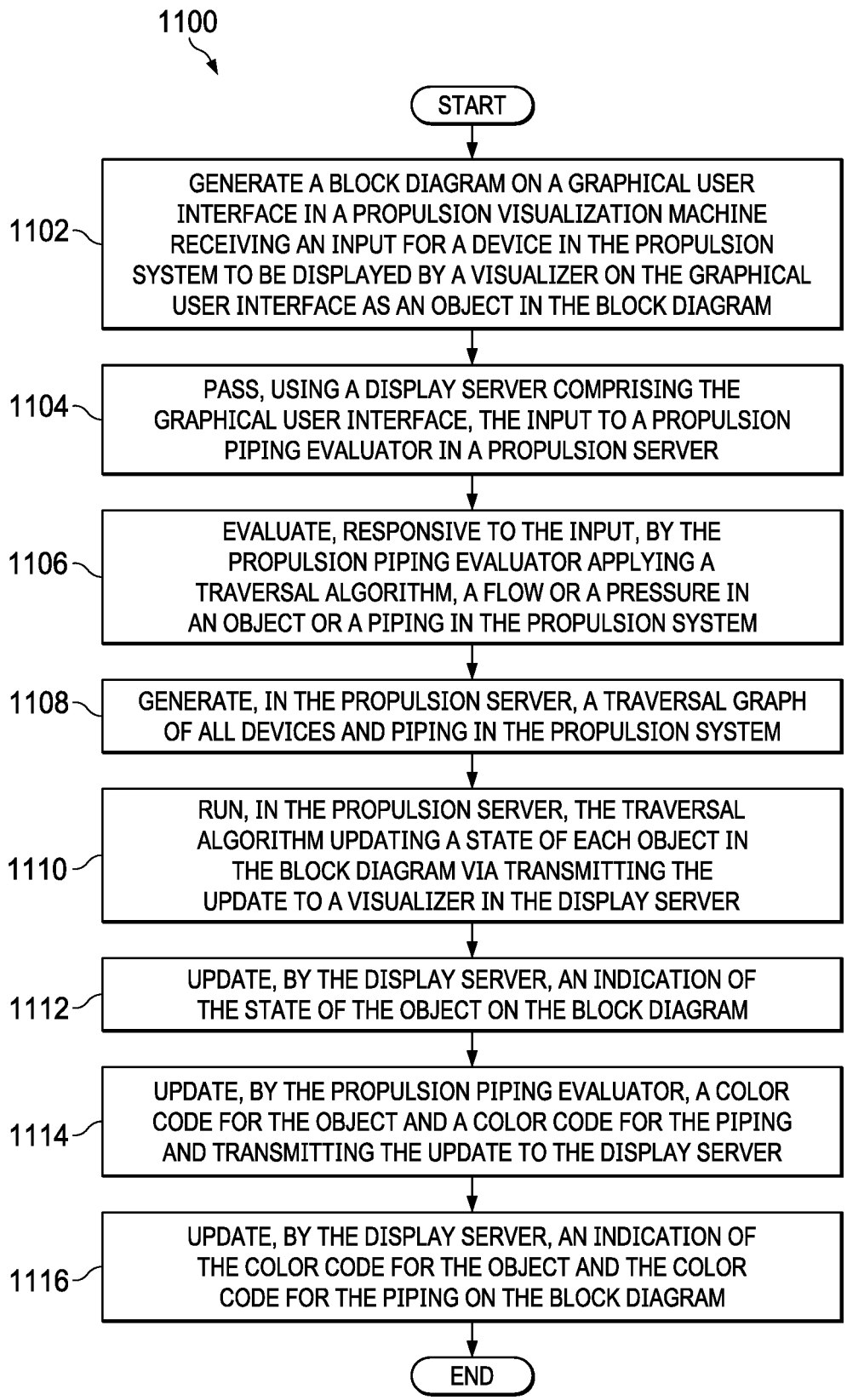
FIG. 11 is an illustration of a flowchart of a process for visualizing a propulsion system and interacting with a virtual model thereof depicted in accordance with an illustrative example.

Hence, propulsion visualization machine 500 described at least as above provides novel hardware for executing a novel process for visualizing a propulsion system. Turning now to FIG. 11, a flowchart is shown of a process for visualizing a propulsion system and interacting with a virtual model thereof depicted in accordance with an illustrative example. Process 1100 depicted in FIG. 11 begins with generating a block diagram on a graphical user interface in a propulsion visualization machine receiving an input for a device in the propulsion system to be displayed by a visualizer on the graphical user interface as an object in the block diagram (operation 1102).

Process 1100 continues by passing, using a display server comprising the graphical user interface, the input to a propulsion piping evaluator in a propulsion server (operation 1104). Process 1100 may also include evaluating, responsive to the input, by the propulsion piping evaluator applying an algorithm, a flow or a pressure in an object or a piping in the propulsion system (operation 1106). Process 1100 may further include generating, in the propulsion server, a traversal graph of all devices and piping in the propulsion system (operation 1108). Process 1100 may further include running, in the propulsion server, a traversal algorithm updating a state of each object in the block diagram via transmitting the update to a visualizer in the display server (operation 1110).

Process 1100 may also include updating, by the display server, an indication of the state of the object on the block diagram (operation 1112), and include updating, by the propulsion piping evaluator, a color code for the object and a color code for the piping and transmitting the update to the display server (operation 1114). Process 1100 may further include updating, by the display server, an indication of the color code for the object and the color code for the piping on the block diagram.

Figure 12A:
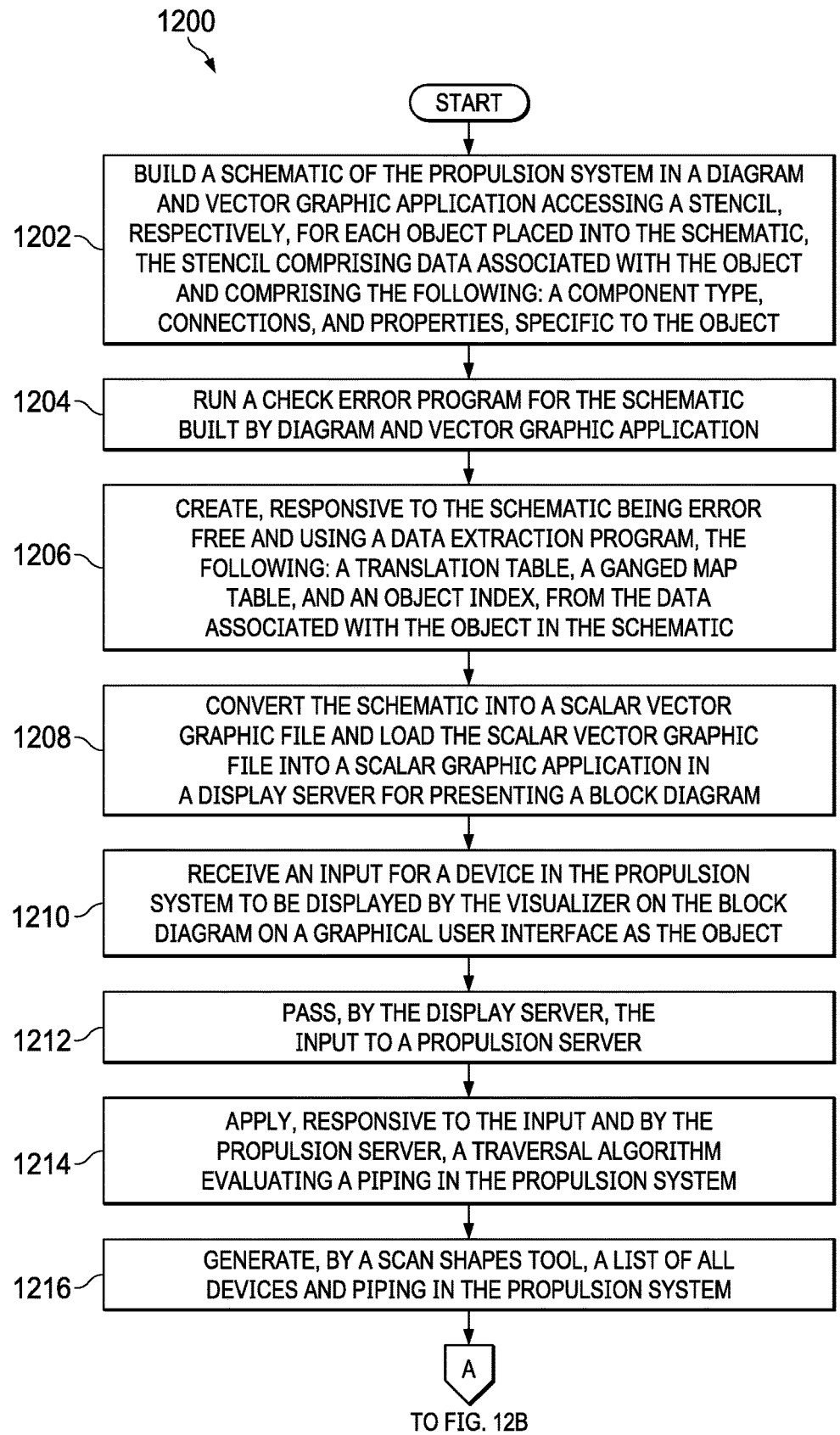
FIG. 12A is an illustration of a flowchart of a process for visualizing a propulsion system and interacting with a virtual model thereof depicted in accordance with an illustrative example.
Figure 12B:
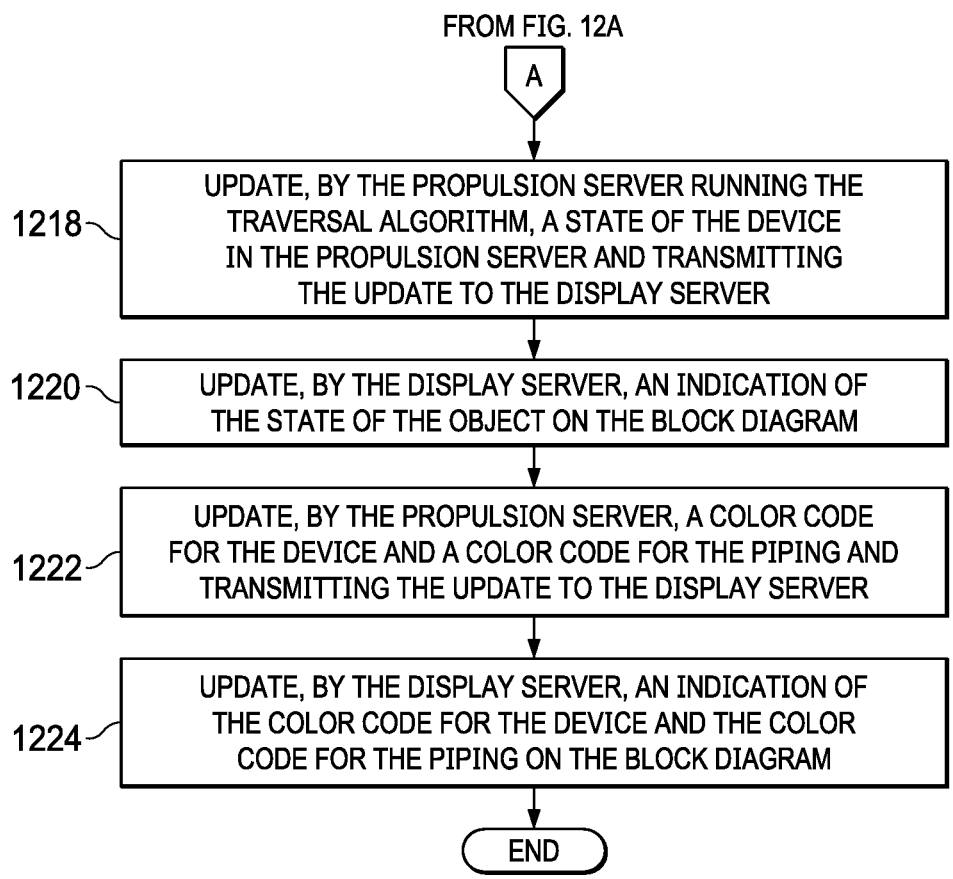
FIG. 12B is an illustration that provides a continuation of FIG. 12A of a flowchart a process of for visualizing a propulsion system and interacting with a virtual model thereof depicted in accordance with an illustrative example.

Additionally, propulsion visualization machine 500 described at least as above provides novel hardware for executing a novel process for visualizing a propulsion system and interacting with a virtual model thereof. Turning now to FIGS. 12A and 12B, a flowchart is shown of a process for visualizing a propulsion system and interacting with a virtual model thereof depicted in accordance with an illustrative example. Process 1200 depicted in FIGS. 12A and 12B may begin with building a schematic of the propulsion system in a diagram and vector graphic application accessing a stencil, respectively, for each object placed into the schematic, the stencil comprising data associated with the object and comprising component type, connections, and properties specific to the object (operation 1202). Process 1200 continues by running a check error program for a scalar vector graphic file built, from input, by a diagram and vector graphic application (operation 1204).

Process 1200 may also include creating, responsive to the scalar vector graphic file being error free and using a data extraction program, the following: a translation table, a ganged map table, and an object index, from the data associated with the object in the schematic construct tool (operation 1206). Process 1200 may also include converting the schematic into a scalar vector graphic file and loading the scalar vector graphic file of into a scalar graphic application in a display server for presenting a block diagram (operation 1208), and receiving an input for a device in the propulsion system to be displayed by the visualizer on the block diagram on a graphical user interface as the object (operation 1210).

Process 1200 may also include passing, by the display server, the input to a propulsion server (operation 1212). Process 1200 may include applying, responsive to the input and by the propulsion server, an algorithm evaluating a piping in the propulsion system (operation 1214). Process 1200 may further include generating, by a scan shapes tool, a list of all devices and piping in the propulsion system (operation 1216).

Additionally, process 1200 may include updating, by the propulsion server running a traversal algorithm, a state of the device in the propulsion server and transmitting the update to the display server (operation 1218), and updating, by the display server, an indication of the state of the object on the block diagram (operation 1220). Further, process 1200 may include updating, by the propulsion server, a color code for the device and a color code for the piping and transmitting the update to the display server (operation 1222), and updating by the display server, an indication of the color code for the device and the color code for the piping on the block diagram (operation 1224).

As described above, propulsion visualization machine 500 described at least as above may be adapted to function for a fluid system as a fluid visualization machine in a manner similar to that described and shown above for a fluid system. Hence, a fluid visualization machine is described above that provides novel hardware for executing a novel process for visualizing a fluid system and interacting with a virtual model thereof.

Figure 13:
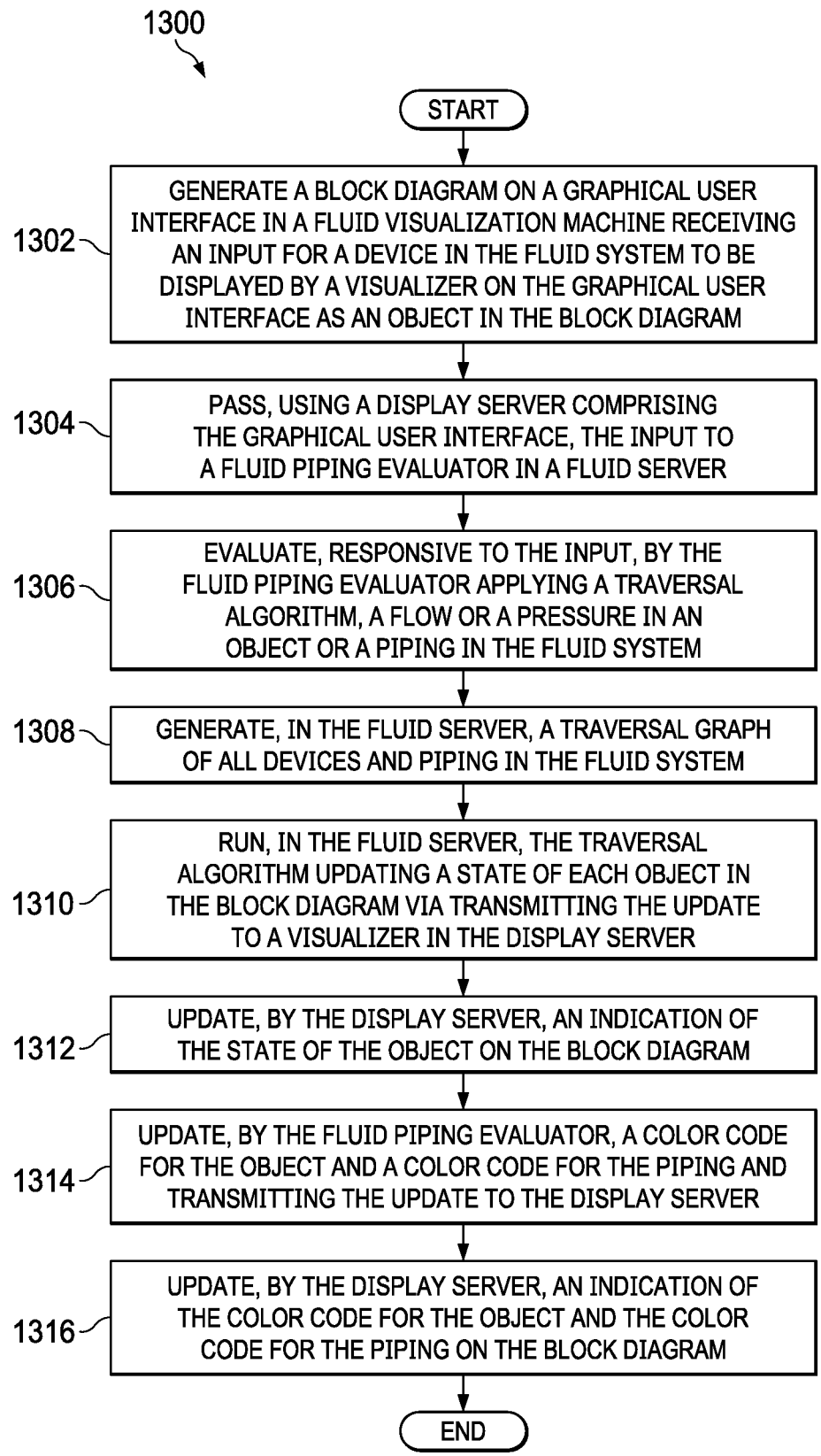
FIG. 13 is an illustration of a flowchart of for visualizing a fluid system and interacting with a virtual model thereof depicted in accordance with an illustrative example.

Turning now to FIG. 13, a flowchart is shown of a process for visualizing a fluid system and interacting with a virtual model thereof depicted in accordance with an illustrative example. Process 1300 depicted in FIG. 13 begins with generating a block diagram on a graphical user interface in a fluid visualization machine receiving an input for a device in the fluid system to be displayed by a visualizer on the graphical user interface as an object in the block diagram (operation 1302).

Process 1300 continues by passing, using a display server comprising the graphical user interface, the input to a fluid piping evaluator in a fluid server (operation 1304). Process 1300 may also include evaluating, responsive to the input, by the fluid piping evaluator applying an algorithm, a flow or a pressure in an object or a piping in the fluid system (operation 1306). Process 1300 may further include generating, in the fluid server, a traversal graph of all devices and piping in the fluid system (operation 1308). Process 1300 may further include running, in the fluid server, a traversal algorithm updating a state of each object in the block diagram via transmitting the update to a visualizer in the display server (operation 1310).

Process 1300 may also include updating, by the display server, an indication of the state of the object on the block diagram (operation 1312), and include updating, by the fluid piping evaluator, a color code for the object and a color code for the piping and transmitting the update to the display server (operation 1314). Process 1300 may further include updating, by the display server, an indication of the color code for the object and the color code for the piping on the block diagram.

Figure 14A:
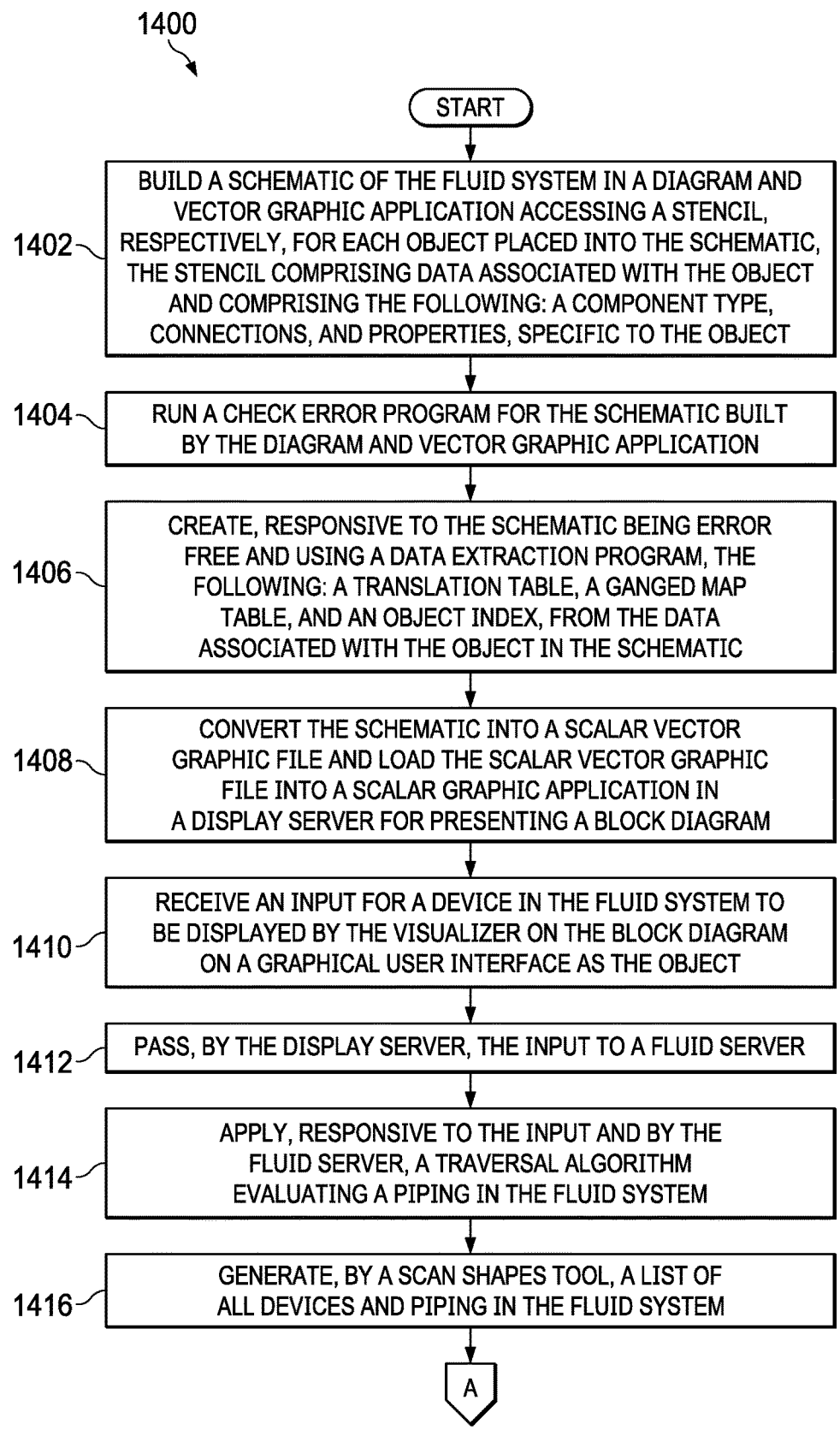
FIG. 14A is an illustration of a flowchart of a process for visualizing a fluid system and interacting with a virtual model thereof depicted in accordance with an illustrative example.
Figure 14B:
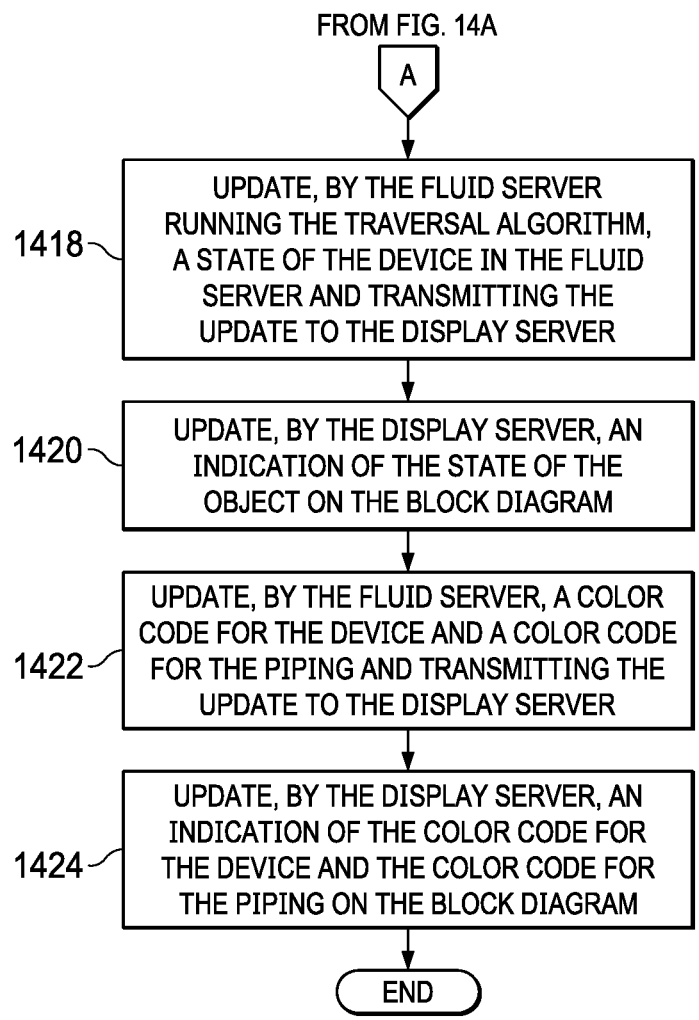
FIG. 14B is an illustration that provides a continuation of FIG. 14A of a flowchart of a process for visualizing a fluid system and interacting with a virtual model thereof depicted in accordance with an illustrative example.

Additionally, the fluid visualization machine described at least as above provides novel hardware for executing a novel process for visualizing a fluid system and interacting with a virtual model thereof. Turning now to FIGS. 14A and 14B, a flowchart is shown of a process for visualizing a fluid system and interacting with a virtual model thereof depicted in accordance with an illustrative example. Process 1400 depicted in FIGS. 14A and 14B, may begin with building a schematic of the fluid system in a diagram and vector graphic application accessing a stencil, respectively, for each object placed into the schematic, the stencil comprising data associated with the object and comprising component type, connections, and properties specific to the object (operation 1402). Process 1400 continues by running a check error program for a scalar vector graphic file built, from input, by a diagram and vector graphic application (operation 1404).

Process 1400 may also include creating, responsive to the scalar vector graphic file being error free and using a data extraction program, the following: a translation table, a ganged map table, and an object index, from the data associated with the object in the schematic construct tool (operation 1406). Process 1400 may also include converting the schematic into a scalar vector graphic file and loading the scalar vector graphic file of into a scalar graphic application in a display server for presenting a block diagram (operation 1408), and receiving an input for a device in the fluid system to be displayed by the visualizer on the block diagram on a graphical user interface as the object (operation 1410).

Process 1400 may also include passing, by the display server, the input to a fluid server (operation 1412). Process 1400 may include applying, responsive to the input and by the fluid server, an algorithm evaluating a piping in the fluid system (operation 1414). Process 1400 may further include generating, by a scan shapes tool, a list of all devices and piping in the fluid system (operation 1416).

Additionally, process 1400 may include updating, by the fluid server running a traversal algorithm, a state of the device in the fluid server and transmitting the update to the display server (operation 1418), and updating, by the display server, an indication of the state of the object on the block diagram (operation 1420). Further, process 1400 may include updating, by the fluid server, a color code for the device and a color code for the piping and transmitting the update to the display server (operation 1422), and updating by the display server, an indication of the color code for the device and the color code for the piping on the block diagram (operation 1424).

There for the application describes above at least example embodiments described in the following clauses:

Clause 1. A machine that comprises:
  a display server that comprises:
    a visualizer configured to update a block diagram that comprises an object that represents a component in a propulsion system; and
    a first socket configured to communicate with a second socket in a propulsion server associated with a scan shapes tool that comprises a data extraction program configured to generate and store: a translation table, a ganged map table, and an object index, configured to accelerate a traversal algorithm configured to control the visualizer in the display server.

Clause 2. The machine of claim 1, wherein the propulsion server is configured to design, validate, and verify at least one of the following: a design, an assembly, or an integration, of objects in a propulsion system.

Clause 3. The machine of claim 1, wherein the block diagram is an executable block diagram of the propulsion system.

Clause 4. The machine of claim 1, wherein the propulsion server comprises a command handler configured to update a state of an object in the propulsion system.

Clause 5. The machine of claim 1, wherein the propulsion server comprises a propulsion piping evaluator configured to recursively update the piping for a propulsion system.

Clause 6. The machine of claim 1, wherein a propulsion piping evaluator in the propulsion server comprises the traversal algorithm.

Clause 7. The machine of claim 1, wherein the propulsion server comprises the traversal algorithm and is configured to access the translation table, the ganged map table, and the object index, configured to input into the traversal algorithm.

Clause 8. The machine of claim 1, wherein the propulsion server comprises an action log configured to record activities that transpire in the block diagram.

Clause 9. The machine of claim 1, wherein the propulsion server is configured to update at least one of: an identification, a state, and a color, of components of the propulsion system as represented in the block diagram, respectively, by an object in the block diagram.

Clause 10. The machine of claim 1, wherein the object comprises a categorization.

Clause 11. The machine of claim 1, wherein the object comprises a categorization selected from a group that consists of: an active object, a passive object, and piping.

Clause 12. The machine of claim 1, wherein the object comprises a set of rules and a set of behaviors.

Clause 13. The machine of claim 1, wherein the object comprises a categorization as an active object that comprises at least one of the following states: on, off, a pressure, a composition, and a commodity type.

Clause 14. A process for visualizing a propulsion system, the process comprising:
- generating a block diagram on a graphical user interface in a propulsion visualization machine receiving an input for a device in the propulsion system to be displayed by a visualizer on the graphical user interface as an object in the block diagram;
- a display server comprising the graphical user interface and passing the input to a propulsion piping evaluator in a propulsion server;
- responsive to the input, the propulsion piping evaluator applying an algorithm evaluating a flow or a pressure in an object or a piping in the propulsion system;
- the propulsion piping evaluator generating a traversal graph of devices and piping in the propulsion system;
- the propulsion server running a traversal algorithm updating a state of objects in the block diagram via transmitting the update to a visualizer in the display server;
- the display server updating an indication of the state of the object on the block diagram;
- the propulsion piping evaluator updating a color code for the object and a color code for the piping and transmitting the update to the display server; and
- the display server updating an indication of the color code for the object and the color code for the piping on the block diagram.

Clause 15. The process of claim 14, further comprising the propulsion piping evaluator generating a composition or a pressure traversing to a specific connection at a source object and routed through connections to a destination object in the propulsion system.

Clause 16. The process of claim 14, further comprising:
- verifying a receipt or an absence of a composition or a pressure in connections to a destination object; and
- responsive to the absence, identifying a particular connection at which an error occurred in the receipt of the composition or the pressure, and the particular connection and a particular virtual module respectively connected to and including the particular connection.

Clause 17. The process of claim 14, further comprising the state of the device being selected from a group comprising at least one of the following: on, off, a pressure, a composition, and a commodity type.

Clause 18. The process of claim 14, further comprising the propulsion server creating a traversal graph tracking objects traversed in the block diagram during a runtime visualization of the propulsion system.

Clause 19. The process of claim 14, further comprising the propulsion server creating, using traversal logic using a state of an active object and a behavior definition of a passive object in the block diagram, a traversal graph tracking objects traversed in the block diagram during a runtime visualization of the propulsion system.

Clause 20. The process of claim 14, further comprising categorizing objects in the block diagram as one of: an active object, a passive object, and the piping.

Clause 21. The process of claim 14, further comprising an active object comprising at least one of the following: an origination point for property state values for the block diagram, or an interactive object of the block diagram triggering a change in a state of a downline object in the propulsion system presented in the block diagram.

Clause 22. The process of claim 14, further comprising the piping being any device connecting two objects of the propulsion system together in the block diagram and carrying a fluid or a pressure from one object to a downline object in the block diagram.

Clause 23. The process of claim 14, further comprising the piping being any device connecting two objects of the propulsion system together in the block diagram and carrying a value for one of the following: a pressure, a composition, or a commodity type from one object, to a downline object in the block diagram.

Clause 24. The process of claim 14, further comprising recording activities during a runtime on the block diagram in an action log.

Clause 25. The process of claim 14, further comprising using an action log of activities during a runtime on the block diagram for rolling back actions of the propulsion system indicated on the block diagram to a desired prior point in the runtime.

Clause 26. The process of claim 14, further comprising using an action log of activities during a runtime on the block diagram for establishing a starting condition for a new runtime of the block diagram.

Clause 27. The process of claim 14, further comprising recording a snapshot in a runtime for the block diagram at a selected time recording a state of valves in the propulsion system presented in the block diagram.

Clause 28. The process of claim 14, further comprising recording a snapshot in a runtime for the block diagram at a selected time recording a state of pressure regulators in the propulsion system presented in the block diagram.

Clause 29. The process of claim 14, further comprising:
- accelerating processing of the traversal algorithm via a data extraction program in a scan shapes tool creating support files comprising: a translation table, a ganged map table, and an object index; and
- the traversal algorithm accessing the support files.

Clause 30. The process of claim 14, further comprising receiving the input for a change to the state of the object into the propulsion server from an external command and control system communicating with the propulsion server.

Clause 31. The process of claim 14, further comprising a scan shapes tool extracting essential elements of data attached to objects in a schematic in a diagram and vector graphic application, and creating a translation table, a ganged map table, and an object index, accessed by a propulsion piping evaluator.

Clause 32. The process of claim 14 further comprising constructing the block diagram comprising, for objects, tailored propulsion system stencils comprising data indicating: component type, connections, and/or properties, specific to the object respectively.

Clause 33. A process for visualizing a propulsion system, the process comprising:
- building a schematic of the propulsion system in a diagram and vector graphic application accessing a stencil, respectively, for objects placed into the schematic, the stencil comprising data associated with the object and comprising component type, connections, and properties specific to the object;
- running a check error program for a scalar vector graphic file built, from input, by a diagram and vector graphic application;
- responsive to the scalar vector graphic file being error free, creating, using a data extraction program, the following: a translation table, a ganged map table, and an object index, from the data associated with the object in the scalar vector graphic file;

converting the schematic into a scalar vector graphic file and loading the scalar vector graphic file into a scalar graphic application in a display server for presenting a block diagram;

receiving an input for a device in the propulsion system to be displayed by the visualizer on the block diagram on a graphical user interface as the object;

the display server passing the input to a propulsion server;

responsive to the input, the propulsion server applying an algorithm evaluating a piping in the propulsion system;

a scan shapes tool generating a list of devices and piping in the propulsion system;

the propulsion server running a traversal algorithm updating a state of the device in the propulsion server and transmitting the update to the display server;

the display server updating an indication of the state of the object on the block diagram;

the propulsion server updating a color code for the device and a color code for the piping and transmitting the update to the display server; and the display server updating an indication of the color code for the device and the color code for the piping on the block diagram.

Clause 34. The process of claim 33, further comprising generating a fluid or a pressure traversing to a specific connection at an origination object and routed through connections to a destination.

Clause 35. The process of claim 33, further comprising:
verifying a receipt or an absence of a fluid or a pressure in the connections; and
responsive to the absence, identifying a particular connection at which an error occurred in the receipt of the composition or the pressure, and the particular connection and a particular object respectively connected to and including the particular connection.

Clause 36. The process of claim 33, further comprising a state of the object being selected from a group comprising at least one of the following: on, off, a pressure, a composition, and a commodity type.

Clause 37. The process of claim 33, further comprising the propulsion server creating a traversal graph tracking objects traversed in the block diagram during a runtime visualization of the propulsion system.

Clause 38. The process of claim 33, further comprising the propulsion server creating, using traversal logic using a state of an active object and a behavior definition of a passive object in the block diagram, a graph tracking objects traversed in the block diagram during a runtime visualization of the propulsion system.

Clause 39. The process of claim 33, further comprising categorizing objects in the block diagram as one of the following: an active object, a passive object, and the piping.

Clause 40. The process of claim 33 further comprising an active object comprising at least one of the following: an origination point for property state values for the block diagram, or an interactive object of the block diagram triggering a change in a state of a downline object in the propulsion system presented in the block diagram.

Clause 41. The process of claim 33 further comprising the piping being any device connecting two objects of the propulsion system together in the block diagram and carrying a fluid or a pressure from one object to a downline object in the block diagram.

Clause 42. The process of claim 33 further comprising the piping being any device connecting two objects of the propulsion system together in the block diagram and carrying a value for one of the following: a pressure, a composition, or a commodity type of one object, to a downline object in the block diagram.

Clause 43. The process of claim 33 further comprising recording activities during a runtime on the block diagram in an action log.

Clause 44. The process of claim 33 further comprising using an action log of activities during a runtime on the block diagram for rolling back actions of the propulsion system indicated on the block diagram to a desired prior point in the runtime.

Clause 45. The process of claim 33 further comprising using an action log of activities during a runtime on the block diagram for establishing a starting condition for a new runtime of the block diagram.

Clause 46. The process of claim 33 further comprising recording a snapshot in a runtime for the block diagram at a selected time recording a state of valves in the propulsion system presented in the block diagram.

Clause 47. The process of claim 33 further comprising recording a snapshot in a runtime for the block diagram at a selected time recording a state of pressure regulators in the propulsion system presented in the block diagram.

Clause 48. The process of claim 33 further comprising:
accelerating processing of the traversal algorithm via a data extraction program in a scan shapes tool creating support files comprising the following: a translation table, a ganged map table, and an object index; and
the traversal algorithm accessing the support files.

Clause 49. The process of claim 33 further comprising receiving the input for a change to the state of the device into the propulsion server from an external command and control system communicating with the propulsion server.

Clause 50. The process of claim 33 further comprising the scan shapes tool extracting essential elements of data attached to objects in a schematic in a diagram and vector graphic application, and creating the following: a translation table, a ganged map table, and an object index, accessed by a fluid piping evaluator.

Clause 51. The process of claim 33 further comprising constructing the block diagram comprising tailored propulsion system stencils comprising object data comprising data indicating the following: component type, connections, and/or properties, specific to the object respectively.

Clause 52. A machine that comprises:
display server that comprises:
a visualizer configured to update a block diagram that comprises an object that represents a device in a fluid system; and
a first socket configured to communicate with a second socket in a fluid server associated with a scan shapes tool that comprises a data extraction program configured to generate and store: a translation table, a ganged map table, and an object index, configured to accelerate a traversal algorithm configured to control a visualizer in the display server.

Clause 53. The machine of claim 52, wherein the fluid server is configured to: design, validate, and verify, at least one of the following: a design, an assembly, or an integration, of objects in a fluid system.

Clause 54. The machine of claim 52, wherein the block diagram is an executable block diagram of the fluid system.

Clause 55. The machine of claim 52, wherein the fluid server comprises a command handler configured to update a state of an object in the fluid system.

Clause 56. The machine of claim 52, wherein the fluid server comprises a fluid piping evaluator configured to recursively update the piping for the fluid system.

Clause 57. The machine of claim 52, wherein a fluid piping evaluator comprises the traversal algorithm.

Clause 58. The machine of claim 52, wherein the fluid server comprises the traversal algorithm and is configured to access the translation table, the ganged map table, and the object index, configured to input into the traversal algorithm.

Clause 59. The machine of claim 52, wherein the fluid server comprises an action log configured to record activities that transpire in the block diagram.

Clause 60. The machine of claim 52, wherein the fluid server is configured to update at least one of: an identification, a state, and a color, of components of the fluid system as represented in the block diagram, respectively, by an object in the block diagram.

Clause 61. The machine of claim 52, wherein the object comprises a categorization selected from a group that consists of the following:
an active object that comprises at least one of the following states: on, off, a pressure, a composition, and a commodity type;
a passive object; and
piping.

Clause 62. The machine of claim 52, wherein the object comprises a set of rules and a set of behaviors.

Clause 63. A process for visualizing a fluid system, the process comprising:
building a schematic of the fluid system in a diagram and vector graphic application accessing a stencil, respectively, for objects placed into the schematic, the stencil comprising data associated with the object and comprising component type, connections, and properties specific to the object;
running a check error program for a scalar vector graphic file built, from input, by a diagram and vector graphic application;
responsive to the scalar vector graphic file being error free, creating support files;
converting the schematic into a scalar vector graphic file and loading the scalar vector graphic file of into a scalar graphic application in a display server for presenting a block diagram;
receiving an input for a device in the fluid system to be displayed by the visualizer on the block diagram on a graphical user interface as the object;
the display server passing the input to a fluid server;
responsive to the input, the fluid server applying an algorithm evaluating a piping in the fluid system;
a scan shapes tool generating a list of devices and piping in the fluid system;
the fluid server running a traversal algorithm updating a state of the device in the fluid server and transmitting the update to the display server;
the display server updating an indication of the state of the object on the block diagram;
the fluid server updating a color code for the device and a color code for the piping and transmitting the update to the display server; and
the display server updating an indication of the color code for the device and the color code for the piping on the block diagram.

Clause 64. The process of claim 63, further comprising generating a fluid or a pressure traversing to a specific connection at an origination object and routed through connections to a destination.

Clause 65. The process of claim 63, further comprising:
verifying a receipt or an absence of a fluid or a pressure in the connections; and
responsive to the absence, identifying a particular connection at which an error occurred in the receipt of a fluid or the pressure, and the particular connection and a particular object respectively connected to and including the particular connection.

Clause 66. The process of claim 63, further comprising a state of the object being selected from a group comprising at least one of the following: on, off, a pressure, a composition, and a commodity type.

Clause 67. The process of claim 63, further comprising the fluid server creating a traversal graph tracking objects traversed in the block diagram during a runtime visualization of the fluid system.

Clause 68. The process of claim 63, further comprising the fluid server creating, using traversal logic using a state of an active object and a behavior definition of a passive object in the block diagram, a graph tracking objects traversed in the block diagram during a runtime visualization of the fluid system.

Clause 69. The process of claim 63, further comprising categorizing objects in the block diagram as one of the following: an active object, a passive object, and the piping.

Clause 70. The process of claim 63, further comprising an active object comprising at least one of the following: an origination point for property state values for the block diagram, or an interactive object of the block diagram triggering a change in a state of a downline object in the fluid system presented in the block diagram.

Clause 71. The process of claim 63, further comprising the piping being any device connecting two objects of the fluid system together in the block diagram and carrying a fluid or a pressure from one object to a downline object in the block diagram.

Clause 72. The process of claim 63, further comprising the piping being any device connecting two objects of the fluid system together in the block diagram and carrying a value for one of the following: a pressure, a composition, or a commodity type of one object, to a downline object in the block diagram.

Clause 73. The process of claim 63, further comprising recording activities during a runtime on the block diagram in an action log.

Clause 74. The process of claim 63, further comprising using an action log of activities during a runtime on the block diagram for rolling back actions of the fluid system indicated on the block diagram to a desired prior point in the runtime.

Clause 75. The process of claim 63, further comprising using an action log of activities during a runtime on the block diagram for establishing a starting condition for a new runtime of the block diagram.

Clause 76. The process of claim 63, further comprising recording a snapshot in a runtime for the block diagram at a selected time recording a state of valves in the fluid system presented in the block diagram.

Clause 77. The process of claim 63, further comprising recording a snapshot in a runtime for the block diagram at a selected time recording a state of pressure regulators in the fluid system presented in the block diagram.

Clause 78. The process of claim 63, further comprising:
accelerating processing of the traversal algorithm via a data extraction program in a scan shapes tool creating the support files comprising the following: a translation table, a ganged map table, and an object index from data for objects in the scalar vector graphic file; and the traversal algorithm accessing the support files.

Clause 79. The process of claim 63, further comprising receiving the input for a change to the state of the object into the fluid server from an external command and control system communicating with the fluid server.

Clause 80. The process of claim 63 further comprising the scan shapes tool extracting essential elements of data attached to objects in the schematic in the diagram and vector graphic application, and creating the following: a translation table, a ganged map table, and an object index, accessed by a fluid piping evaluator.

Clause 81. The process of claim 63 further comprising constructing the block diagram comprising tailored fluid system stencils comprising object data comprising data indicating the following: component type, connections, and/or properties, specific to the object respectively.

Clause 82. A process for visualizing a fluid system, the process comprising:
generating a block diagram on a graphical user interface in a fluid visualization machine receiving an input for a device in the fluid system to be displayed by a visualizer on the graphical user interface as an object in the block diagram;
a display server comprising the graphical user interface and passing the input to a fluid piping evaluator in a fluid server;
responsive to the input, the fluid piping evaluator applying an algorithm evaluating a flow or a pressure in an object or a piping in the fluid system;
the fluid piping evaluator generating a traversal graph of devices and piping in the fluid system;
the fluid server running a traversal algorithm updating a state of objects in the block diagram via transmitting the update to a visualizer in the display server;
the display server updating an indication of the state of the object on the block diagram;
the fluid piping evaluator updating a color code for the object and a color code for the piping and transmitting the update to the display server; and
the display server updating an indication of the color code for the object and the color code for the piping on the block diagram.

Clause 83. The process of claim 82, further comprising the fluid piping evaluator generating a composition or a pressure traversing to a specific connection at a source object and routed through connections to a destination object in the fluid system.

Clause 84. The process of claim 82, further comprising:
verifying a receipt or an absence of a fluid or a pressure in connections to a destination object; and
responsive to the absence, identifying a particular connection at which an error occurred in the receipt of the fluid or the pressure, and the particular connection and a particular virtual module respectively connected to and including the particular connection.

Clause 85. The process of claim 82, further comprising the state of the device being selected from a group comprising at least one of the following: on, off, a pressure, a composition, and a commodity type.

Clause 86. The process of claim 82, further comprising the fluid server creating a traversal graph tracking objects traversed in the block diagram during a runtime visualization of the fluid system.

Clause 87. The process of claim 82, further comprising the fluid server creating, using traversal logic using a state of an active object and a behavior definition of a passive object in the block diagram, a traversal graph tracking objects traversed in the block diagram during a runtime visualization of the fluid system.

Clause 88. The process of claim 82, further comprising categorizing objects in the block diagram as one of: an active object, a passive object, and the piping.

Clause 89. The process of claim 82, further comprising an active object comprising at least one of the following: an origination point for property state values for the block diagram, or an interactive object of the block diagram triggering a change in a state of a downline object in the fluid system presented in the block diagram.

Clause 90. The process of claim 82, further comprising the piping being any device connecting two objects of the fluid system together in the block diagram and carrying a fluid or a pressure from one object to a downline object in the block diagram.

Clause 91. The process of claim 82, further comprising the piping being any device connecting two objects of the fluid system together in the block diagram and carrying a value for one of the following: a pressure, a composition, or a commodity type from one object, to a downline object in the block diagram.

Clause 92. The process of claim 82, further comprising recording activities during a runtime on the block diagram in an action log.

Clause 93. The process of claim 82, further comprising using an action log of activities during a runtime on the block diagram for rolling back actions of the fluid system indicated on the block diagram to a desired prior point in the runtime.

Clause 94. The process of claim 82, further comprising using an action log of activities during a runtime on the block diagram for establishing a starting condition for a new runtime of the block diagram.

Clause 95. The process of claim 82, further comprising recording a snapshot in a runtime for the block diagram at a selected time recording a state of valves in the fluid system presented in the block diagram.

Clause 96. The process of claim 82, further comprising recording a snapshot in a runtime for the block diagram at a selected time recording a state of pressure regulators in the fluid system presented in the block diagram.

Clause 97. The process of claim 82, further comprising:
accelerating processing of the traversal algorithm via a data extraction program in a scan shapes tool creating support files comprising: a translation table, a ganged map table, and an object index, from data for objects in the scalar vector graphic file; and
the traversal algorithm accessing the support files.

Clause 98. The process of claim 82, further comprising receiving the input for a change to the state of the object into fluid server from an external command and control system communicating with the fluid server.

Clause 99. The process of claim 82, further comprising a scan shapes tool extracting essential elements of data attached to objects in a schematic in a diagram and vector graphic application, and creating a translation table, a ganged map table, and an object index, accessed by a fluid piping evaluator.

Clause 100. The process of claim 82 further comprising constructing the block diagram comprising, for objects, tailored fluid system stencils comprising data indicating: component type, connections, and/or properties, specific to the object respectively.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A machine that comprises:
    a scan shapes tool;
    a propulsion server;
    a display server that comprises:
    a visualizer configured to update a block diagram that comprises an object that represents a component in a propulsion system comprising: a pressurant tank, a pressure transducer, or a pressure regulator; and a first socket configured to communicate with a second socket in the propulsion server associated with the scan shapes tool that comprises a data extraction program configured to generate and store: a translation table, a ganged map table, and an object index, configured to accelerate a traversal algorithm configured to control the visualizer in the display server.

2. The machine of claim 1, wherein the propulsion server is configured to design, validate, and verify at least one of the following: a design, an assembly, or an integration, of objects in the propulsion system.

3. The machine of claim 1, wherein the block diagram is an executable block diagram of the propulsion system.

4. The machine of claim 1, wherein the propulsion server comprises a command handler configured to update a state of the object that represents the component in the propulsion system.

5. The machine of claim 1, wherein the propulsion server comprises a propulsion piping evaluator configured to recursively update piping for the propulsion system.

6. The machine of claim 1, wherein a propulsion piping evaluator in the propulsion server comprises the traversal algorithm.

7. The machine of claim 1, wherein the propulsion server comprises the traversal algorithm and is configured to access the translation table, the ganged map table, and the object index, configured to input into the traversal algorithm.

8. The machine of claim 1, wherein the propulsion server comprises an action log configured to record activities that transpire in the block diagram.

9. The machine of claim 1, wherein the propulsion server is configured to update at least one of: an identification, a state, and a color, of components of the propulsion system as represented in the block diagram, respectively, by the object in the block diagram.

10. The machine of claim 1, wherein the object comprises a categorization.

11. The machine of claim 1, wherein the object comprises a categorization selected from a group that consists of: an active object, a passive object, and piping.

12. The machine of claim 1, wherein the object comprises a set of rules and a set of behaviors.

13. The machine of claim 1, wherein the object comprises a categorization as an active object that comprises at least one of the following states: on, off, a pressure, a composition, and a commodity type.

14. A process for visualizing a propulsion system, the process comprising:
    generating a block diagram on a graphical user interface in a propulsion visualization machine receiving an input for a device in the propulsion system to be displayed by a visualizer on the graphical user interface as an object in the block diagram, wherein the propulsion system comprises: a pressurant tank, a pressure transducer, or a pressure regulator;
    a display server comprising the graphical user interface and passing the input to a propulsion piping evaluator in a propulsion server;
    responsive to the input, the propulsion piping evaluator applying an algorithm evaluating a flow or a pressure in a component or a piping in the propulsion system;
    the propulsion piping evaluator generating a traversal graph of devices and piping in the propulsion system;
    the propulsion server running a traversal algorithm updating a state of objects in the block diagram via transmitting the update to a visualizer in the display server;
    the display server updating an indication of a state of the component represented by the object on the block diagram;
    the propulsion piping evaluator updating a color code for the object and a color code for the piping and transmitting an update to the display server; and
    the display server updating an indication of the color code for the object and the color code for the piping on the block diagram.

15. The process of claim 14, further comprising the propulsion piping evaluator generating a composition or a pressure traversing to a specific connection at a source object and routed through connections to a destination object in the propulsion system.

16. The process of claim 14, further comprising:
    verifying a receipt or an absence of a composition or a pressure in connections to a destination object; and
    responsive to the absence, identifying a particular connection at which an error occurred in the receipt of the composition or the pressure, and the particular connection and a particular virtual module respectively connected to and including the particular connection.

17. The process of claim 14, further comprising a state of the device being selected from a group comprising at least one of the following: on, off, a pressure, a composition, and a commodity type.

18. The process of claim 14, further comprising the propulsion server creating a traversal graph tracking objects traversed in the block diagram during a runtime visualization of the propulsion system.

19. The process of claim 14, further comprising the propulsion server creating, using traversal logic using a state of an active object and a behavior definition of a passive object in the block diagram, a traversal graph tracking objects traversed in the block diagram during a runtime visualization of the propulsion system.

20. The process of claim 14, further comprising categorizing objects in the block diagram as one of: an active object, a passive object, and the piping.

21. The process of claim 14, further comprising an active object comprising at least one of the following: an origination point for property state values for the block diagram, or an interactive object of the block diagram triggering a change in a state of a downline object in the propulsion system presented in the block diagram.

22. The process of claim 14, further comprising the piping being any device connecting two objects of the propulsion system together in the block diagram and carrying a fluid or a pressure from one object to a downline object in the block diagram.

23. The process of claim 14, further comprising the piping being any device connecting two objects of the propulsion system together in the block diagram and carrying a value for one of the following: a pressure, a composition, or a commodity type from one object, to a downline object in the block diagram.

24. The process of claim 14, further comprising recording activities during a runtime on the block diagram in an action log.

25. The process of claim 14, further comprising using an action log of activities during a runtime on the block diagram for rolling back actions of the propulsion system indicated on the block diagram to a desired prior point in the runtime.

26. The process of claim 14, further comprising using an action log of activities during a runtime on the block diagram for establishing a starting condition for a new runtime of the block diagram.

27. The process of claim 14, further comprising recording a snapshot in a runtime for the block diagram at a selected time recording a state of valves in the propulsion system presented in the block diagram.

28. The process of claim 14, further comprising recording a snapshot in a runtime for the block diagram at a selected time recording a state of pressure regulators in the propulsion system presented in the block diagram.

29. The process of claim 14, further comprising:
   accelerating processing of the traversal algorithm via a data extraction program in a scan shapes tool creating support files comprising: a translation table, a ganged map table, and an object index; and
   the traversal algorithm accessing the support files.

30. The process of claim 14, further comprising receiving the input for a change to the state of the object into the propulsion server from an external command and control system communicating with the propulsion server.

31. The process of claim 14, further comprising a scan shapes tool extracting essential elements of data attached to objects in a schematic in a diagram and vector graphic application, and creating a translation table, a ganged map table, and an object index, accessed by a propulsion piping evaluator.

32. The process of claim 14 further comprising constructing the block diagram comprising, for objects, tailored propulsion system stencils comprising data indicating: component type, connections, and/or properties, specific to the object respectively.

33. A process for visualizing a propulsion system, the process comprising:
   building a schematic of the propulsion system in a diagram and vector graphic application accessing a stencil, respectively, for objects placed into the schematic, the stencil comprising data associated with the object and comprising component type, connections, and properties specific to the object, wherein the propulsion system comprises: a pressurant tank, a pressure transducer, or a pressure regulator;
   running a check error program for a scalar vector graphic file built, from input, by a diagram and vector graphic application;
   responsive to the scalar vector graphic file being error free, creating, using a data extraction program, the following: a translation table, a ganged map table, and an object index, from the data associated with the object in the scalar vector graphic file;
   converting the schematic into a second scalar vector graphic file and loading the second scalar vector graphic file into a scalar graphic application in a display server for presenting a block diagram;
   receiving an input for a device in the propulsion system to be displayed by the visualizer on the block diagram on a graphical user interface as the object;
   the display server passing the input to a propulsion server;
   responsive to the input, the propulsion server applying an algorithm evaluating a piping in the propulsion system;
   a scan shapes tool generating a list of devices and piping in the propulsion system;
   the propulsion server running a traversal algorithm updating a state of the device in the propulsion server and transmitting the update to the display server;
   the display server updating an indication of a state of the object on the block diagram;
   the propulsion server updating a color code for a device in the list of devices and a color code for the piping and transmitting an update to the display server; and
   the display server updating an indication of the color code for the device and the color code for the piping on the block diagram.

34. The process of claim 33, further comprising generating a fluid or a pressure traversing to a specific connection at an origination object and routed through connections to a destination.

35. The process of claim 33, further comprising:
   verifying a receipt or an absence of a fluid or a pressure in the connections; and
   responsive to the absence, identifying a particular connection at which an error occurred in the receipt of a composition or the pressure, and the particular connection and a particular object respectively connected to and including the particular connection.

36. The process of claim 33, further comprising a state of the object being selected from a group comprising at least one of the following: on, off, a pressure, a composition, and a commodity type.

37. The process of claim 33, further comprising the propulsion server creating a traversal graph tracking objects traversed in the block diagram during a runtime visualization of the propulsion system.

38. The process of claim 33, further comprising the propulsion server creating, using traversal logic using a state of an active object and a behavior definition of a passive object in the block diagram, a graph tracking objects traversed in the block diagram during a runtime visualization of the propulsion system.

39. The process of claim 33, further comprising categorizing objects in the block diagram as one of the following: an active object, a passive object, and the piping.

40. The process of claim 33 further comprising an active object comprising at least one of the following: an origination point for property state values for the block diagram, or an interactive object of the block diagram triggering a change in a state of a downline object in the propulsion system presented in the block diagram.

41. The process of claim 33 further comprising the piping being any device connecting two objects of the propulsion system together in the block diagram and carrying a fluid or a pressure from one object to a downline object in the block diagram.

42. The process of claim 33 further comprising the piping being any device connecting two objects of the propulsion system together in the block diagram and carrying a value for one of the following: a pressure, a composition, or a commodity type of one object, to a downline object in the block diagram.

43. The process of claim 33 further comprising recording activities during a runtime on the block diagram in an action log.

44. The process of claim 33 further comprising using an action log of activities during a runtime on the block diagram for rolling back actions of the propulsion system indicated on the block diagram to a desired prior point in the runtime.

45. The process of claim 33 further comprising using an action log of activities during a runtime on the block diagram for establishing a starting condition for a new runtime of the block diagram.

46. The process of claim 33 further comprising recording a snapshot in a runtime for the block diagram at a selected time recording a state of valves in the propulsion system presented in the block diagram.

47. The process of claim 33 further comprising recording a snapshot in a runtime for the block diagram at a selected time recording a state of pressure regulators in the propulsion system presented in the block diagram.

48. The process of claim 33 further comprising:
accelerating processing of the traversal algorithm via a data extraction program in a scan shapes tool creating support files comprising the following: a translation table, a ganged map table, and an object index; and
the traversal algorithm accessing the support files.

49. The process of claim 33 further comprising receiving the input for a change to the state of the device into the propulsion server from an external command and control system communicating with the propulsion server.

50. The process of claim 33 further comprising the scan shapes tool extracting essential elements of data attached to objects in a schematic in a diagram and vector graphic application, and creating the following: a translation table, a ganged map table, and an object index, accessed by a fluid piping evaluator.

51. The process of claim 33 further comprising constructing the block diagram comprising tailored propulsion system stencils comprising object data comprising data indicating the following: component type, connections, and/or properties, specific to the object respectively.

52. A machine that comprises:
a scan shapes tool;
a fluid server;
a display server that comprises:
 a visualizer configured to update a block diagram that comprises an object that represents a device in a fluid system that comprises: a condensing tank, an evaporator, a pump, or a motor; and
 a first socket configured to communicate with a second socket in the fluid server associated with the scan shapes tool that comprises a data extraction program configured to generate and store: a translation table, a ganged map table, and an object index, configured to accelerate a traversal algorithm configured to control a visualizer in the display server.

53. The machine of claim 52, wherein the fluid server is configured to: design, validate, and verify, at least one of the following: a design, an assembly, or an integration, of objects in a fluid system.

54. The machine of claim 52, wherein the block diagram is an executable block diagram of the fluid system.

55. The machine of claim 52, wherein the fluid server comprises a command handler configured to update a state of the object in the fluid propulsion system.

56. The machine of claim 52, wherein the fluid server comprises a fluid piping evaluator configured to recursively update piping for the fluid system.

57. The machine of claim 52, wherein a fluid piping evaluator comprises the traversal algorithm.

58. The machine of claim 52, wherein the fluid server comprises the traversal algorithm and is configured to access the translation table, the ganged map table, and the object index, configured to input into the traversal algorithm.

59. The machine of claim 52, wherein the fluid server comprises an action log configured to record activities that transpire in the block diagram.

60. The machine of claim 52, wherein the fluid server is configured to update at least one of: an identification, a state, and a color, of components of the fluid system as represented in the block diagram, respectively, by the object in the block diagram.

61. The machine of claim 52, wherein the object comprises a categorization selected from a group that consists of the following:
an active object that comprises at least one of the following states: on, off, a pressure, a composition, and a commodity type;
a passive object; and
piping.

62. The machine of claim 52, wherein the object comprises a set of rules and a set of behaviors.

63. A process for visualizing a fluid system, the process comprising:
building a schematic of the fluid system in a diagram and vector graphic application accessing a stencil, respectively, for objects placed into the schematic, the stencil comprising data associated with the object and comprising component type, connections, and properties specific to the object, wherein the fluid system comprises: a condensing tank, an evaporator, a pump, or a motor;
running a check error program for a scalar vector graphic file built, from input, by a diagram and vector graphic application;
responsive to the scalar vector graphic file being error free, creating support files;
converting the schematic into a scalar vector graphic file and loading the scalar vector graphic file of into a scalar graphic application in a display server for presenting a block diagram;
receiving an input for a device in the fluid system to be displayed by the visualizer on the block diagram on a graphical user interface as the object;
the display server passing the input to a fluid server;
responsive to the input, the fluid server applying an algorithm evaluating a piping in the fluid system;
a scan shapes tool generating a list of devices and piping in the fluid system;
the fluid server running a traversal algorithm updating a state of the device in the fluid server and transmitting the update to the display server;

the display server updating an indication of a state of the object on the block diagram;

the fluid server updating a color code for the device and a color code for the piping and transmitting an update to the display server; and the display server updating an indication of the color code for the device and the color code for the piping on the block diagram.

64. The process of claim 63, further comprising generating a fluid or a pressure traversing to a specific connection at an origination object and routed through connections to a destination.

65. The process of claim 63, further comprising:
verifying a receipt or an absence of a fluid or a pressure in the connections; and responsive to the absence, identifying a particular connection at which an error occurred in the receipt of a fluid or the pressure, and the particular connection and a particular object respectively connected to and including the particular connection.

66. The process of claim 63, further comprising a state of the object being selected from a group comprising at least one of the following: on, off, a pressure, a composition, and a commodity type.

67. The process of claim 63, further comprising the fluid server creating a traversal graph tracking objects traversed in the block diagram during a runtime visualization of the fluid system.

68. The process of claim 63, further comprising the fluid server creating, using traversal logic using a state of an active object and a behavior definition of a passive object in the block diagram, a graph tracking objects traversed in the block diagram during a runtime visualization of the fluid system.

69. The process of claim 63, further comprising categorizing objects in the block diagram as one of the following: an active object, a passive object, and the piping.

70. The process of claim 63, further comprising an active object comprising at least one of the following: an origination point for property state values for the block diagram, or an interactive object of the block diagram triggering a change in a state of a downline object in the fluid system presented in the block diagram.

71. The process of claim 63, further comprising the piping being any device connecting two objects of the fluid system together in the block diagram and carrying a fluid or a pressure from one object to a downline object in the block diagram.

72. The process of claim 63, further comprising the piping being any device connecting two objects of the fluid system together in the block diagram and carrying a value for one of the following: a pressure, a composition, or a commodity type of one object, to a downline object in the block diagram.

73. The process of claim 63, further comprising recording activities during a runtime on the block diagram in an action log.

74. The process of claim 63, further comprising using an action log of activities during a runtime on the block diagram for rolling back actions of the fluid system indicated on the block diagram to a desired prior point in the runtime.

75. The process of claim 63, further comprising using an action log of activities during a runtime on the block diagram for establishing a starting condition for a new runtime of the block diagram.

76. The process of claim 63, further comprising recording a snapshot in a runtime for the block diagram at a selected time recording a state of valves in the fluid system presented in the block diagram.

77. The process of claim 63, further comprising recording a snapshot in a runtime for the block diagram at a selected time recording a state of pressure regulators in the fluid system presented in the block diagram.

78. The process of claim 63, further comprising:
accelerating processing of the traversal algorithm via a data extraction program in a scan shapes tool creating the support files comprising the following: a translation table, a ganged map table, and an object index from data for objects in the scalar vector graphic file; and the traversal algorithm accessing the support files.

79. The process of claim 63, further comprising receiving the input for a change to the state of the object into the fluid server from an external command and control system communicating with the fluid server.

80. The process of claim 63 further comprising the scan shapes tool extracting essential elements of data attached to objects in the schematic in the diagram and vector graphic application, and creating the following: a translation table, a ganged map table, and an object index, accessed by a fluid piping evaluator.

81. The process of claim 63 further comprising constructing the block diagram comprising tailored fluid system stencils comprising object data comprising data indicating the following: component type, connections, and/or properties, specific to the object respectively.

82. A process for visualizing a fluid system, the process comprising:
generating a block diagram on a graphical user interface in a fluid visualization machine receiving an input for a device in the fluid system to be displayed by a visualizer on the graphical user interface as an object in the block diagram, wherein the fluid system comprises: a condensing tank, an evaporator, a pump, or a motor;

a display server comprising the graphical user interface and passing the input to a fluid piping evaluator in a fluid server;

responsive to the input, the fluid piping evaluator applying an algorithm evaluating a flow or a pressure in a device or a piping in the fluid system;

the fluid piping evaluator generating a traversal graph of devices and piping in the fluid system;

the fluid server running a traversal algorithm updating a state of objects in the block diagram via transmitting the update to a visualizer in the display server;

the display server updating an indication of a state of the object on the block diagram;

the fluid piping evaluator updating a color code for the object and a color code for the piping and transmitting an update to the display server; and the display server updating an indication of the color code for the object and the color code for the piping on the block diagram.

83. The process of claim 82, further comprising the fluid piping evaluator generating a composition or a pressure traversing to a specific connection at a source object and routed through connections to a destination object in the fluid system.

84. The process of claim 82, further comprising:
verifying a receipt or an absence of a fluid or a pressure in connections to a destination object; and responsive to the absence, identifying a particular connection at which an error occurred in the receipt of the fluid or the pressure, and the particular connection and a particular virtual module respectively connected to and including the particular connection.

85. The process of claim 82, further comprising a state of the device being selected from a group comprising at least one of the following: on, off, a pressure, a composition, and a commodity type.

86. The process of claim 82, further comprising the fluid server creating a traversal graph tracking objects traversed in the block diagram during a runtime visualization of the fluid system.

87. The process of claim 82, further comprising the fluid server creating, using traversal logic using a state of an active object and a behavior definition of a passive object in the block diagram, a traversal graph tracking objects traversed in the block diagram during a runtime visualization of the fluid system.

88. The process of claim 82, further comprising categorizing objects in the block diagram as one of: an active object, a passive object, and the piping.

89. The process of claim 82, further comprising an active object comprising at least one of the following: an origination point for property state values for the block diagram, or an interactive object of the block diagram triggering a change in a state of a downline object in the fluid system presented in the block diagram.

90. The process of claim 82, further comprising the piping being any device connecting two objects of the fluid system together in the block diagram and carrying a fluid or a pressure from one object to a downline object in the block diagram.

91. The process of claim 82, further comprising the piping being any device connecting two objects of the fluid system together in the block diagram and carrying a value for one of the following: a pressure, a composition, or a commodity type from one object, to a downline object in the block diagram.

92. The process of claim 82, further comprising recording activities during a runtime on the block diagram in an action log.

93. The process of claim 82, further comprising using an action log of activities during a runtime on the block diagram for rolling back actions of the fluid system indicated on the block diagram to a desired prior point in the runtime.

94. The process of claim 82, further comprising using an action log of activities during a runtime on the block diagram for establishing a starting condition for a new runtime of the block diagram.

95. The process of claim 82, further comprising recording a snapshot in a runtime for the block diagram at a selected time recording a state of valves in the fluid system presented in the block diagram.

96. The process of claim 82, further comprising recording a snapshot in a runtime for the block diagram at a selected time recording a state of pressure regulators in the fluid system presented in the block diagram.

97. The process of claim 82, further comprising:
accelerating processing of the traversal algorithm via a data extraction program in a scan shapes tool creating support files comprising: a translation table, a ganged map table, and an object index, from data for objects in a scalar vector graphic file; and
the traversal algorithm accessing the support files.

98. The process of claim 82, further comprising receiving the input for a change to the state of the object into fluid server from an external command and control system communicating with the fluid server.

99. The process of claim 82, further comprising a scan shapes tool extracting essential elements of data attached to objects in a schematic in a diagram and vector graphic application, and creating a translation table, a ganged map table, and an object index, accessed by a fluid piping evaluator.

100. The process of claim 82 further comprising constructing the block diagram comprising, for objects, tailored fluid system stencils comprising data indicating: component type, connections, and/or properties, specific to the object respectively.

* * * * *

UNITED STATES PATENT AND TRADEMARK OFFICE
CERTIFICATE OF CORRECTION

PATENT NO. : 12,417,328 B2
APPLICATION NO. : 17/455028
DATED : September 16, 2025
INVENTOR(S) : Alex W. Chao et al.

Page 1 of 1

It is certified that error appears in the above-identified patent and that said Letters Patent is hereby corrected as shown below:

In the Specification

Column 48, Line 9, correct "fluid propulsion system." to read -- fluid system. --

Signed and Sealed this
Eleventh Day of November, 2025

John A. Squires
*Director of the United States Patent and Trademark Office*